(12) United States Patent
Liu

(10) Patent No.: US 11,402,923 B2
(45) Date of Patent: Aug. 2, 2022

(54) INPUT METHOD, APPARATUS BASED ON VISUAL RECOGNITION, AND ELECTRONIC DEVICE

(71) Applicant: BOE TECHNOLOGY GROUP CO., LTD., Beijing (CN)

(72) Inventor: Pengyu Liu, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 17/361,576

(22) Filed: Jun. 29, 2021

(65) Prior Publication Data

US 2021/0405762 A1    Dec. 30, 2021

(30) Foreign Application Priority Data

Jun. 30, 2020 (CN) .......................... 202010622153.5

(51) Int. Cl.
| G06F 3/01 | (2006.01) |
| G06V 30/32 | (2022.01) |
| G06V 20/40 | (2022.01) |
| G06V 40/20 | (2022.01) |
| G06V 40/10 | (2022.01) |

(52) U.S. Cl.
CPC .............. G06F 3/017 (2013.01); G06V 20/46 (2022.01); G06V 30/347 (2022.01); G06V 40/107 (2022.01); G06V 40/28 (2022.01)

(58) Field of Classification Search
CPC ...................................................... G06F 3/017
See application file for complete search history.

(56) References Cited

U.S. PATENT DOCUMENTS

2014/0198031 A1*   7/2014  Xiong ........................ G06F 3/01
2016/0154469 A1    6/2016  Zhao et al.

FOREIGN PATENT DOCUMENTS

CN            102508547          6/2012

* cited by examiner

*Primary Examiner* — James J Debrow
(74) *Attorney, Agent, or Firm* — Dority & Manning, P.A.

(57) ABSTRACT

An input method based on visual recognition, performed at a processor, includes: obtaining frames of gesture images; recognizing a size and a position of a hand feature in each frame; determining whether a variation amount in the size of the hand feature in the frame as compared to a preset calibration size is less than a preset threshold value; causing a position of the hand feature in the frame to be stored as a handwriting point; obtaining at least one stroke trace, according to handwriting points stored, each including handwriting points stored in sequence according to positions of hand features in at least two consecutive frames; and recognizing the at least one stroke trace and obtaining a target object corresponding to the at least one stroke trace.

20 Claims, 19 Drawing Sheets

INPUT METHOD, APPARATUS BASED ON VISUAL RECOGNITION, AND ELECTRONIC DEVICE

CROSS-REFERENCE TO RELATED APPLICATION

This application claims priority to Chinese Patent Application No. 202010622153.5, filed on Jun. 30, 2020, which is incorporated herein by reference in its entirety.

TECHNICAL FIELD

The present disclosure relates to the field of gesture recognition technologies, and in particular, to an input method and an apparatus based on visual recognition, and an electronic device.

BACKGROUND

At present, widely used character input methods include keyboard input and handwriting input, etc. With the development of recognition technology, the gesture input technology has also been developed by leaps and bounds. The gesture input technology achieves different input functions through different traces generated by, for example, a user's finger stroking on a screen of an electronic device or stroking in mid-air of the screen of the electronic device.

SUMMARY

In an aspect, an input method based on visual recognition is provided. The method is performed at a processor and includes: obtaining a plurality of frames of gesture images; recognizing a size and a position of a hand feature in each frame of gesture image of the plurality of frames of gesture images; determining whether a variation amount in the size of the hand feature in the frame of gesture image as compared to a preset calibration size of the hand feature is less than a preset threshold value; in response to determining that a variation amount in a size of a hand feature, in each frame of gesture image in at least part of the plurality of frames of gesture images, as compared to the preset demarcated size of the hand feature is less than the preset threshold value, causing a position of the hand feature in the frame of gesture image to be stored as a handwriting point; obtaining at least one stroke trace according to a plurality of handwriting points stored, each stroke trace including handwriting points stored in sequence according to positions of hand features in at least two consecutive frames of gesture images in the at least part of the plurality of frames of gesture images; and recognizing the at least one stroke trace and obtaining a target object corresponding to the at least one stroke trace.

In some embodiments, before determining whether the variation amount in the size of the hand feature in the frame of gesture image as compared to the preset calibration size of the hand feature is less than the preset threshold value, the method further includes obtaining the calibration size of the hand feature.

In some embodiments, obtaining the calibration size of the hand feature includes: obtaining a calibration gesture image; determining whether a calibration gesture in the calibration gesture image is located within a preset calibration gesture outline; and in response to determining that the calibration gesture in the calibration gesture image is located within the preset calibration gesture outline, obtaining a size of a hand feature of the calibration gesture and causing the size to be stored as the calibration size of the hand feature.

In some embodiments, obtaining a stroke trace of the at least one stroke trace includes: determining a starting point of the stroke trace; and determining an ending point of the stroke trace.

In some embodiments, determining the starting point of the stroke trace includes: determining whether there is a position of a hand feature corresponding to a handwriting point in a previous frame of gesture image adjacent to any frame of frames of gesture images corresponding to the plurality of handwriting points; and in response to determining that there is not the position of the hand feature corresponding to the handwriting point in the previous frame of gesture image, determining that a handwriting point corresponding to a position of a hand feature in the frame of gesture image is the starting point of the stroke trace.

In some embodiments, determining the ending point of the stroke trace includes: determining whether there is a position of a hand feature corresponding to a handwriting point in a next frame of gesture image adjacent to any frame of frames of gesture images corresponding to the plurality of handwriting points; and in response to determining that there is not the position of the hand feature corresponding to the handwriting point in the next frame of gesture image, determining that a handwriting point corresponding to a position of a hand feature in the frame of gesture image is the ending point of the stroke trace.

In some embodiments, after obtaining the at least one stroke trace and before recognizing the at least one stroke trace, the input method further includes: determining whether an interval between a time when a current frame of gesture image is obtained and a time when the at least one stroke trace is obtained is greater than a preset interval, the time when the at least one stroke trace is obtained being a time when a frame of gesture image corresponding to a last handwriting point of the at least one stroke trace is obtained; and in response to determining that the interval between the time when the current frame of gesture image is obtained and the time when the at least one stroke trace is obtained is greater than the preset interval, recognizing the at least one stroke trace.

In some embodiments, in response to determining that the interval between the time when the current frame of gesture image is obtained and the time when the at least one stroke trace is obtained is less than or equal to the preset interval, the method further includes: obtaining the current frame of gesture image; determining whether a gesture in the current frame of gesture image is same as a preset stroke gesture; in response to determining that the gesture in the current frame of gesture image is same as the preset stroke gesture, determining whether a variation amount in a size of a hand feature in the current frame of gesture image as compared to the preset calibration size of the hand feature is less than the preset threshold value; and in response to determining that the variation amount in the size of the hand feature in the current frame of gesture image as compared to the preset calibration size of the hand feature is less than the preset threshold value, causing a position of the hand feature in the current frame of gesture image to be stored as a handwriting point.

In some embodiments, after obtaining the at least one stroke trace and before recognizing the at least one stroke trace, the method further includes: obtaining a current frame of gesture image; determining whether a gesture in the current frame of gesture image is same as a preset end stroke gesture; and in response to determining that the gesture in the current frame of gesture image is same as the preset end stroke gesture, recognizing the at least one stroke trace.

In some embodiments, recognizing the at least one stroke trace and obtaining the target object corresponding to the at least one stroke trace includes: recognizing the at least one stroke trace, and obtaining a plurality of candidate target objects corresponding to the at least one stroke trace; and determining the target object from the plurality of candidate target objects.

In some embodiments, determining the target object from the plurality of candidate target objects includes: continuing to obtain a plurality of consecutive frames of gesture images; determining whether a gesture in each of the plurality of consecutive frames of gesture images is same as a preset selection gesture; and in response to determining that the gesture in each of the plurality of consecutive frames of gesture images is same as the preset selection gesture, determining the target object from the plurality of candidate target objects according to a hand position in a last frame of the plurality of consecutive frames of gesture images.

In some embodiments, determining the target object from the plurality of candidate target objects according to the hand position in the last frame of the plurality of consecutive frames of gesture images includes: continuing to obtain at least one frame of gesture image after the last frame of the plurality of consecutive frames of gesture images; determining whether a gesture in the at least one frame of gesture image after the last frame of the plurality of consecutive frames of gesture images is same as a preset confirmation gesture; and in response to determining that the gesture in the at least one frame of gesture image after the last frame of the plurality of consecutive frames of gesture images is same as the preset confirmation gesture, determining a candidate target object corresponding to the hand position in the last frame of the plurality of consecutive frames of gesture images as the target object.

In some embodiments, after recognizing the at least one stroke trace and obtaining the target object corresponding to the at least one stroke trace, the method further includes: continuing to obtain a plurality of consecutive frames of gesture images; determining whether a gesture in each of the plurality of consecutive frames of gesture images is same as a preset deletion gesture; and in response to determining that the gesture in each of the plurality of consecutive frames of gesture images is same as the preset deletion gesture, deleting at least portion of the target object.

In some embodiments, after recognizing the at least one stroke trace and obtaining the target object corresponding to the at least one stroke trace, the method further includes clearing the at least one stroke trace.

In another aspect, an input apparatus based on visual recognition is provided. The apparatus includes: a processor, a memory, a display and an image sensor. The processor is configured to: obtain a plurality of frames of gesture images; recognizing a size and a position of a hand feature in each frame of gesture image of the plurality of frames of gesture images; determine whether a variation amount in the size of the hand feature in the frame of gesture image as compared to a preset calibration size of the hand feature is less than a preset threshold value; in response to determining that a variation amount in a size of a hand feature, in each frame of gesture image in at least part of the plurality of frames of gesture images, as compared to the preset calibration size of the hand feature is less than the preset threshold value, send a position of the hand feature in the frame of gesture image to the memory as a handwriting point; obtain at least one stroke trace according to a plurality of handwriting points stored and send the at least one stroke trace to the memory and the display, each stroke trace including handwriting points stored in sequence according to positions of hand features in at least two consecutive frames of gesture images in the at least part of the plurality of frames of gesture images; recognize the at least one stroke trace and obtain a target object corresponding to the at least one stroke trace; and send the target object to the display. The memory is coupled to the processor and configured to store the preset calibration size of the hand feature, the preset threshold value, and the plurality of handwriting points. The image sensor is coupled to the processor and configured to capture a plurality of frames of gesture images and send the plurality of captured frames of gesture images to the processor. The display is coupled to the processor and configured to display the at least one stroke trace and the target object.

In some embodiments, the processor is further configured to obtain the calibration size of the hand feature.

In some embodiments, the processor is further configured to determine a starting point and an ending point of a stroke trace of the at least one stroke trace.

In some embodiments, the processor is further configured to: determine whether an interval between a time when a current frame of gesture image is obtained and a time when the at least one stroke trace is obtained is greater than a preset interval, the time when the at least one stroke trace is obtained being a time when a frame of gesture image corresponding to a last handwriting point of the at least one stroke trace is obtained; and in response to determining that the interval between the time when the current frame of gesture image is obtained and the time when the at least one stroke trace is obtained is greater than the preset interval, recognize the at least one stroke trace.

In yet another aspect, an electronic device is provided. The electronic device includes a memory and a processor. The memory has stored thereon a computer program executable on the processor, and the computer program, when executed by the processor, implements the method according to any one of the above embodiments.

In yet another aspect, a non-transitory computer-readable storage medium is provided. The medium stores one or more computer program instructions that, when executed by a processor, cause the processor to perform steps of the method according to any one of the above embodiments.

BRIEF DESCRIPTION OF THE DRAWINGS

In order to describe technical solutions in the present disclosure more clearly, accompanying drawings to be used in some embodiments of the present disclosure will be introduced briefly below. However, the accompanying drawings to be described below are merely accompanying drawings of some embodiments of the present disclosure, and a person of ordinary skill in the art may obtain other drawings according to these drawings. In addition, the accompanying drawings to be in the following description may be regarded as schematic diagrams, which are not limitations on an actual size of a product, and an actual process of a method involved in the embodiments of the present disclosure relate.

DETAILED DESCRIPTION

Figure 1:
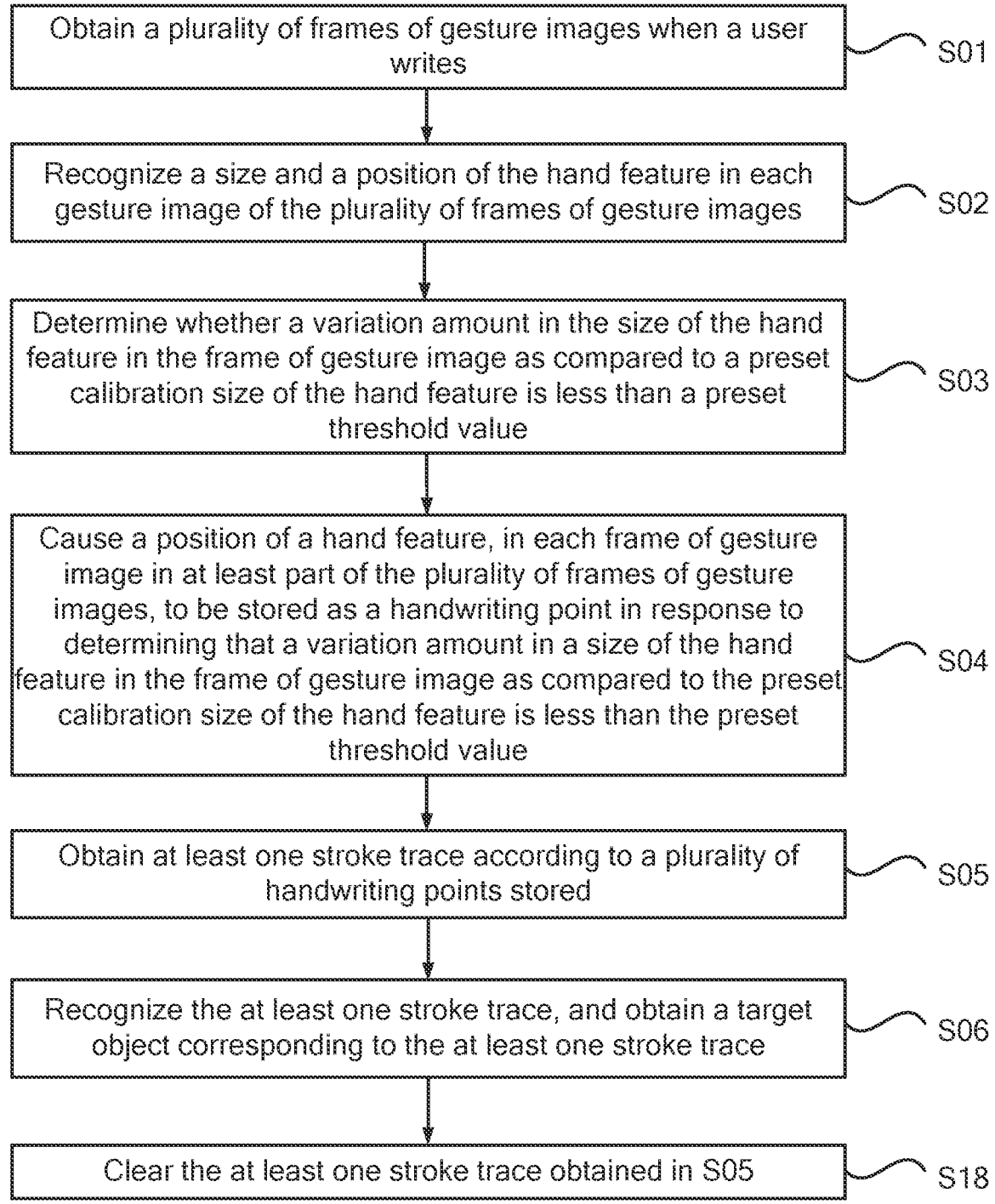
FIG. 1 is a schematic flow diagram of an input method based on visual recognition, in accordance with some embodiments.

The technical solutions in some embodiments of the present disclosure will be described clearly and completely with reference to the accompanying drawings. Obviously, the described embodiments are merely some but not all of embodiments of the present disclosure. All other embodiments obtained made on the basis of the embodiments of the present disclosure by a person of ordinary skill in the art shall be included in the protection scope of the present disclosure.

Unless the context requires otherwise, the term "comprise" and other forms thereof such as the third-person singular form "comprises" and the present participle form "comprising" throughout the description and the claims are construed as an open and inclusive meaning, i.e., "including, but not limited to." In the description of the specification, the terms such as "one embodiment", "some embodiments", "exemplary embodiments", "example", "specific example" or "some examples" are intended to indicate that specific features, structures, materials or characteristics related to the embodiment(s) or example(s) are included in at least one embodiment or example of the present disclosure. Schematic representations of the above terms do not necessarily refer to the same embodiment(s) or example(s). In addition, the specific features, structures, materials, or characteristics described herein may be included in any one or more embodiments or examples in any suitable manner.

Hereinafter, the terms "first", "second" and so on are used for descriptive purposes only, and are not to be construed as indicating or implying the relative importance or implicitly indicating the number of indicated technical features. Thus, features defined as "first" and "second" may explicitly or implicitly include one or more of the features. As used in this specification and the appended claims, the singular forms "a/an" and "the" may also include plural referents unless the content clearly dictates otherwise. In the description of the embodiments of the present disclosure, the term "a/the plurality of" means two or more unless otherwise specified.

In the description of some embodiments, the terms "coupled" and "connected" and their extensions may be used. For example, the term "connected" may be used in the description of some embodiments to indicate that two or more components are in direct physical contact or electrical contact with each other. For another example, the term "coupled" may be used in the description of some embodiments to indicate that two or more elements are in direct physical or electrical contact. However, the term "coupled" or "communicatively coupled" may also mean that two or more elements are not in direct contact with each other, but still cooperate or interact with each other. The embodiments disclosed herein are not necessarily limited to the contents herein.

As used herein, depending on the context, the term "if" is optionally construed as "when" or "in a case where" or "in response to determining" or "in response to detecting". Similarly, depending on the context, the phrase "if it is determined . . . " or "if [a stated condition or event] is detected" is optionally construed as "in a case where it is determined . . . " or "in response to determining . . . " or "in a case where [the stated condition or event] is detected" or "in response to detecting [the stated condition or event]".

The use of the phase "applicable to" or "configured to" herein means an open and inclusive language, which does not exclude devices that are applicable to or configured to perform additional tasks or steps.

In addition, the use of the phase "based on" is meant to be open and inclusive, since a process, step, calculation or other action that is "based on" one or more of the stated conditions or values may, in practice, be based on additional conditions or values exceeding those stated.

The term "about" or "approximately" as used herein includes a stated value and an average value within an acceptable range of deviation of a particular value. The acceptable range of deviation is determined by a person of ordinary skill in the art in view of measurement in question and the error associated with the measurement of a particular quantity (i.e., the limitations of the measurement system).

Some embodiments of the present disclosure provide an input method based on visual recognition. The method may be applied to an electronic device including a processor. The electronic device is a product or component having image capturing and display functions, for example, a mobile phone, a tablet computer, a notebook computer, a personal computer (PC), and so on. For example, the electronic device includes an image sensor for capturing image (i.e., capture device) and a display for displaying image. The embodiments of the present disclosure do not limit the type of the electronic device.

As shown in FIG. 1, the method includes step 01 to step 06 (S01 to S06).

In S01, the processor obtains a plurality of frames of gesture images when a user writes.

In some examples, a camera, for example, serves to capture a plurality of frames of gesture images when the user writes. For example, the capture device (e.g., camera) captures the gesture images at a frame rate of approximately 33 frames per second. The embodiments of the present disclosure do not limit the type of the capture device and the frame rate of capturing, as long as the processor may obtain the gesture images captured by the capture device.

In S02, the processor recognizes a size and a position of a hand feature in each of the plurality of frames of gesture images.

Herein, the hand is, for example, the anterior segment of the upper limb of the user (i.e., the hand defined biologically), a machine hand capable of making different gestures, or a writing pen capable of showing gestures-like motions, which is not limited in the embodiments of the present disclosure.

Based on this, the hand feature is, for example, an index finger tip or a pen tip of the writing pen. The size of the hand feature is, for example, an average width of the index finger tip or the pen tip, and the position of the hand feature is, for example, a position of the index finger tip or the pen tip in a frame of gesture image.

Or, the hand feature may also be other portion of hand, such as a portion of the finger except the fingertip (e.g., knuckle), a palm or other portion of the palm, which is not limited in the embodiments of the present disclosure, as long as the portion of the hand may simulate stroke traces of characters by moving.

For convenience of description, the following embodiments of the present disclosure are all described by taking examples in which the hand feature is the index finger tip of a user.

In S03, the processor determines whether a variation amount in the size of the hand feature in the frame of gesture image as compared to a preset calibration size of the hand feature is less than a preset threshold value.

Herein, the preset calibration size of the hand feature is a value that is measured in advance under a certain preset condition (for example, a condition in which the hand feature of the user is located at a certain distance from the display), and is prestored in, for example, a memory. For example, a width of the index finger tip of the user is measured in advance. Herein, the index finger tip refers to a portion of the index finger proximate to its end. The average width of the index finger tip is an average value of widths of this portion measured at different positions. The average width is prestored in, for example, the memory, and the preset calibration size of the hand feature is the average width.

In S04, the processor causes a position of a hand feature, in each frame of gesture image in at least part of the plurality of frames of gesture images, to be stored as a handwriting point in response to determining that a variation amount in a size of the hand feature in the frame of gesture image as compared to the preset calibration size of the hand feature is less than the preset threshold value.

The variation amount in the size of the hand feature in a frame of gesture image as compared to the preset calibration size of the hand feature may reflect a distance between the hand feature of the user and, for example, a display or a camera when the camera captures the frame of gesture image. Therefore, by determining whether the variation amount in the size of the hand feature in a frame of gesture image as compared to the preset calibration size of the hand feature is less than the preset threshold value, it may be determined whether there is a "lifting pen" motion when the user makes a gesture input. Herein, the "lifting pen" motion is to simulate a motion of lifting a pen before the next stroke and after one stroke is finished when the user writes on a plane such as a paper.

If the variation amount in the size of the hand feature in a frame of gesture image as compared to the preset calibration size of the hand feature is less than the preset threshold value, it means that the variation amount in the size of the hand feature in the frame of gesture image as compared to the preset calibration size of the hand feature is small. That is, when the camera captures the frame of gesture image, the user is making a stroke writing. If the variation amount in the size of the hand feature in a frame of gesture image as compared to the preset calibration size of the hand feature is greater than or equal to the preset threshold value, it means that the variation amount in the size of the hand feature in the frame of gesture image as compared to the preset calibration size of the hand feature is large. That is, when the camera captures the frame of gesture image, the user is making the "lifting pen" motion.

In the embodiments of the present disclosure, the handwriting point is used for indicating that the user does not make the "lifting pen" motion when the camera captures a frame of gesture image corresponding to the handwriting point. That is, the user is making the stroke writing and does not make a "broken pen" motion.

Figure 2A:
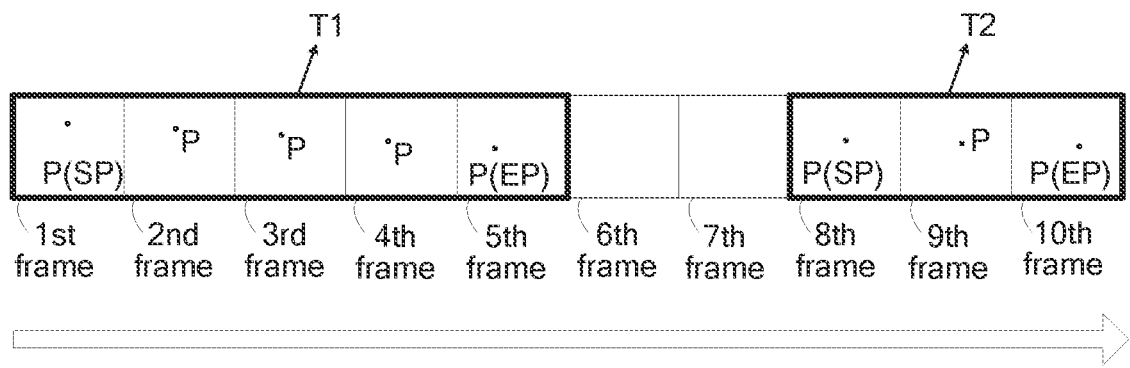
FIG. 2A is a schematic diagram illustrating a gesture image capture process, in accordance with some embodiments.

For example, as shown in FIG. 2A, the processor obtains ten frames of gesture images in sequence, and performs S02 and S03 for each of the ten frames of gesture images, and determines that a variation amount in a size of the hand feature in each of the first frame to the fifth frame (1st frame to 5th frame), and the eighth frame to the tenth frame (8th frame to 10th frame) of the ten frames of gesture images as compared to the preset calibration size of the hand feature is less than the preset threshold value. As a result, it indicates that the user is making the stroke writing when the camera captures the 1st frame to the 5th frame, and the 8th frame to the 10th frame of gesture images, and the user is making the "lifting pen" motion when the camera captures the rest frames of gesture images. Therefore, the processor causes a position (represented as P in FIG. 2A) of the hand feature in each of the 1st frame to the 5th frame, and the 8th frame to the 10th frame of gesture images to be stored as a respective handwriting point. Herein, the large arrow in FIG. 2A and other similar drawings (i.e., subsequent FIGS. 2B and 2C) indicates the obtain order, i.e., the time order, of frames of gesture images.

It will be noted that, in some examples, the processor starts to perform S02 to S04 on the frame of gesture image after obtaining a single frame of gesture image. Or, in some other examples, the processor may also perform S02 to S04 on each of a preset number of frames of gesture images after obtaining the preset number of frames (e.g., five frames) of gesture images.

For convenience of description, in the following embodiments, the method is schematically illustrated by taking examples in which the processor starts to perform S02 to S04 on the frame of gesture image after obtaining a single frame of gesture image.

Based on this, the processor continues to perform the following step 05 (S05) and step 06 (S06).

In S05, the processor obtains at least one stroke trace according to a plurality of handwriting points stored.

Herein, each stroke trace includes handwriting points stored in sequence according to positions of hand features in at least two consecutive frames of gesture images in the at least part of the plurality of frames of gesture images in S01.

In the embodiments of the present disclosure, there are the positions of the hand features corresponding to the handwriting points in the at least two consecutive frames of gesture images, which means that the user is writing and does not make the "lifting pen" motion when the camera captures the at least two consecutive frames of gesture images. Therefore, at least portion of a stroke trace may be formed by connecting the handwriting points corresponding to the positions of the hand features in the at least two frames of gesture images.

In S06, the processor recognizes the at least one stroke trace, and obtains a target object corresponding to the at least one stroke trace.

For example, the processor performs S02 to S04 on each of the ten frames of gesture images it has obtained. For example, as shown in FIG. 2A, the processor causes the position (represented as P in FIG. 2A) of the hand feature in each of the 1st frame to the 5th frame, and the 8th frame to the 10th frame of gesture images to be stored as a respective handwriting point in response to determining that the variation amount in the size of the hand feature in each of the 1st frame to the 5th frame, and the 8th frame to the 10th frame of the ten frames of gesture images as compared to the preset calibration size of the hand feature is less than the preset threshold value. Then, the processor obtains a first stroke trace (represented as T1 in FIG. 2A) through five handwriting points, arranged in sequence, in the 1st frame to the 5th frame of gesture images stored, and obtains a second stroke trace (represented as T2 in FIG. 2A) through three handwriting points, arranged in sequence, in the 8th frame to the 10th frame of gesture images stored.

The processor recognizes the two stroke traces, i.e., the first stroke trace T1 and the second stroke trace T2, and obtains a target object corresponding to the two stroke traces. For example, the processor recognizes the first stroke trace T1 and the second stroke trace T2 according to characters prestored in a database, and determines that the first stroke trace T1 and the second stroke trace T2 correspond two strokes of a Chinese character " 人 ", so as to obtain the target object corresponding to the first stroke trace T1 and the second stroke trace T2, i.e., the Chinese character " 人 ". Herein, the target 人 object (i.e., the Chinese character " 人 ") has two strokes. That is, when the user writes the target object, the first stroke " 丿 " of the target object is written first, then the "lifting pen" motion is made, and then the second stroke " 乀 " of the target object is continued to be written. After the writing of the second stroke is finished, the "lifting pen" motion is made again to finish the writing of the target object. Therefore, the processor obtains the first stroke trace T1 and the second stroke trace T2 according to the plurality of frames of gesture images obtained when the user writes, and may accurately recognize the first stroke trace T1 and the second stroke trace T2.

Figure 2B:
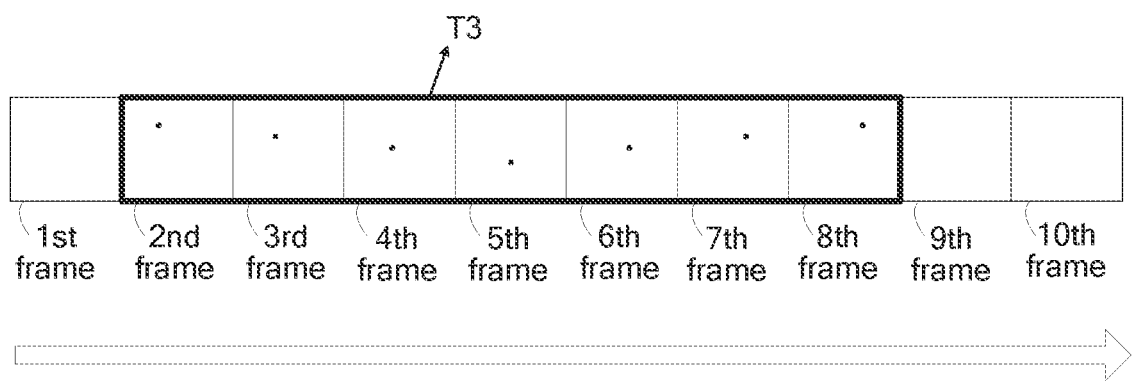
FIG. 2B is a schematic diagram illustrating another gesture image capture process, in accordance with some embodiments.

For another example, the processor performs S02 to S04 on each of ten frames of gesture images it has obtained. For example, as shown in FIG. 2B, the processor determines that a variation amount in a size of a hand feature in each of the second frame to the eighth frame (2nd frame to 8th frame) of the ten frames of gesture images as compared to the preset calibration size of the hand feature is less than the preset threshold value, which indicates that the user is making stroke writing when the camera captures the 2nd frame to the 8th frame of gesture images, and the user is making the "lifting pen" motion when the camera captures the rest frames of gesture images. Therefore, the processor causes a position (represented as P in FIG. 2B) of the hand feature in each of the 2nd frame to the 8th frame of gesture images to be stored as a respective handwriting point, and obtains a third stroke trace (represented as T3 in FIG. 2B) through seven handwriting points, arranged in sequence, of the 2nd frame to the 8th frame of gesture images stored.

The processor recognizes the third stroke trace T3, and obtains a target object corresponding to the third stroke trace T3. For example, the processor recognizes the third stroke trace T3 according to the characters prestored in the database, and determines that the third stroke trace T3 corresponds to a stroke of an English letter " V ", so as to obtain the target object corresponding to the third stroke trace T3, i.e., the English letter " V ". Herein, the target object (i.e., the English letter " V ") has a single stroke, that is, the user writes the target object continuously, and does not make the "lifting pen" motion. Therefore, the processor obtains the third stroke trace T3 according to the plurality of frames of gesture images obtained when the user writes, and may accurately recognize the third stroke trace T3.

Figure 2C:
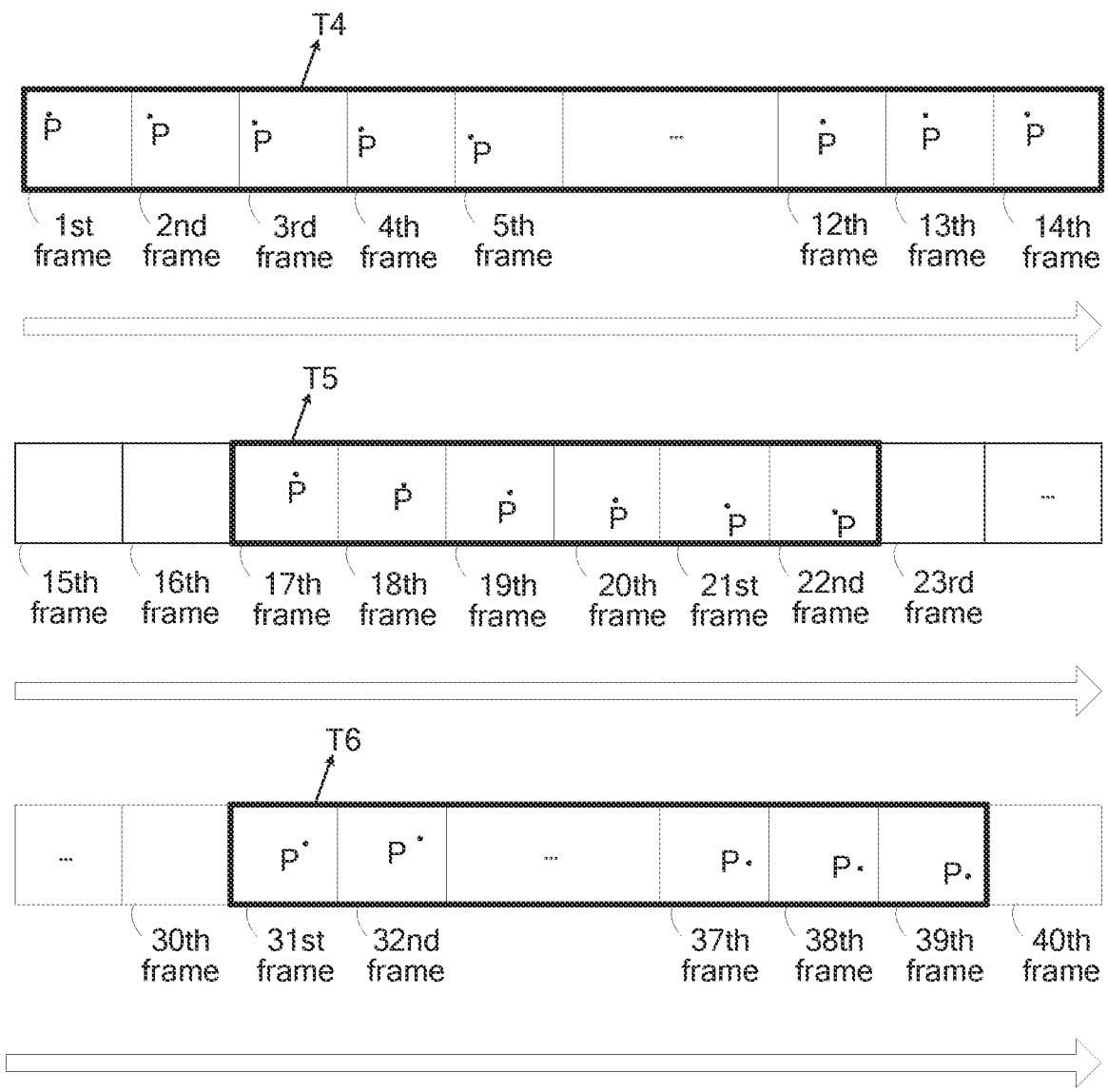
FIG. 2C is a schematic diagram illustrating yet another gesture image capture process, in accordance with some embodiments.

For another example, the processor performs S02 to S04 on each of forty frames of gesture images it has obtained. For example, as shown in FIG. 2C, the processor determines that a variation amount in a size of a hand feature in each of the first frame to the fourteenth frame (1st frame to 14th frame), the seventeenth frame to the twenty-second frame (17th frame to 22th frame), and the thirty-first frame to the thirty-ninth frame (31st frame to 39th frame) of the forty frames of gesture images as compared to the preset calibration size of the hand feature is less than the preset threshold value, which indicates that the user is making the stroke writing when the camera captures the 1st frame to the 14th frame, the 17th frame to the 22th frame, and the 31st frame to the 39th frame of gesture images, and the user is making the "lifting pen" motion when the camera captures the rest frames of gesture images. Therefore, the processor causes a position (represented as P in FIG. 2C) of the hand feature in each of the 1st frame to the 14th frame, the 17th frame to the 22th frame, and the 31st frame to the 39th frame of gesture images to be stored as a respective handwriting point, and obtains a fourth stroke trace (represented as T4 in FIG. 2C) through fourteen handwriting points, arranged in sequence, in the 1st frame to the 14th frame of gesture images stored, obtains a fifth stroke trace (represented as T5 in FIG. 2C) through six handwriting points, arranged in sequence, in the 17th frame to the 22th frame of gesture images stored, and obtains a sixth stroke trace (represented as T6 in FIG. 2C) through nine handwriting points, arranged in sequence, in the 31st frame to the 39th frame of gesture images stored.

The processor recognizes the fourth stroke trace T4, the fifth stroke trace T5 and the sixth stroke trace T6, and obtains a target object corresponding to the fourth stroke trace T4, the fifth stroke trace T5 and the sixth stroke trace T6. For example, the processor recognizes the fourth stroke trace T4, the fifth stroke trace T5 and the sixth stroke trace T6 according to the characters prestored in the database, and determines that the fourth stroke trace T4 corresponds to a stroke of an English letter " O ", and determines that the fifth stroke trace T5 and the sixth stroke trace T6 correspond to stokes of an English letter " n ", so as to obtain the target object corresponding to the fourth stroke trace T4, the fifth stroke trace T5 and the sixth stroke trace T6, i.e., the English word " On ". Herein, the English word " On " include two English letters " O " and " n ", the English letter " O " has one stroke, and the English letter " n " has two strokes. That is, when the user writes the English word " On ", the stroke of the " O " is written continuously first, then the "lifting pen" motion is made, then the two strokes of the English letter " n " are written in sequence, and the "lifting pen" motion is made during a writing process of the two strokes. Therefore, the processor obtains the fourth stroke trace T4, the fifth stroke trace T5 and the sixth stroke trace T6 according to the plurality of frames of gesture images obtained when the user writes, and may accurately recognize the fourth stroke trace T4, the fifth stroke trace T5 and the sixth stroke trace T6.

In the method provided by some embodiments of the present disclosure, whether the user makes the "lifting pen" motion when making the gesture input may be determined by presetting the calibration size of the hand feature (e.g., an average width of the index finger tip of the user) in advance, comparing the size of the hand feature in each frame of gesture image when the user writes with the preset calibration size of the hand feature, and determining a distance change between the hand feature in each frame of gesture image when the user makes the gesture input and, for example, a display or a camera, according to a variation amount therebetween. In this way, an interruption between every adjacent two of a plurality of stroke traces may be recognized, and a "joined-up writing" phenomenon may be avoided, so that a recognition accuracy is improved.

In other words, if a variation amount in a size of the hand feature in a frame of gesture image as compared to the preset calibration size of the hand feature is less than the preset threshold value, it means that a distance change between the hand feature when the user makes the gesture input and, for example, the display or the camera, is very small. That is, at this time, the user does not make the "lifting pen" motion, and is making an input of a complete stroke. Therefore, the processor obtains a point corresponding to the position of the hand feature in the frame of gesture image and causes it to be stored as a handwriting point. If the variation amount in the size of the hand feature in the frame of gesture image as compared to the preset calibration size of the hand feature is greater than or equal to the preset threshold value, it means that the distance change between the hand feature in the frame of gesture image and, for example, the display or the camera, is very large. That is, at this time, the user is making the "lifting pen" motion to pause or finish a stroke input. Therefore, the processor does not need to cause the point corresponding to the position of the hand feature in the frame of gesture image to be stored as a handwriting point.

In this way, by determining whether the user makes the "lifting pen" motion when writing in the gesture input manner, it is determined which handwriting points are continuous to form a same stroke trace, and which handwriting points are disconnected to form different stroke traces.

In the embodiments of the present disclosure, one stroke trace is used to form one stroke of a character. That is, the method provided by the embodiments of the present disclosure simulates a situation in which the user write a stroke continuously, and does not make the "lifting pen" motion in the process. For example, one character includes two strokes, that is, each stroke is a respective stroke trace. In other words, when writing the character, the user makes the "lifting pen" motion after completing the writing of one stroke, and then makes the writing of another stroke. Therefore, in the gesture image corresponding to the "lifting pen" motion made by the user, there is not the position of the hand feature corresponding to the handwriting point, so that stroke traces corresponding to the two strokes are discontinuous. That is, an interruption of the stroke traces is achieved, and each stroke of the character only corresponds to a single stroke trace. As a result, the stroke traces are more similar to actual strokes of the character.

In an example, after gestures are recognized by an input method based on gesture recognition, the gestures correspond to virtual keys on a virtual keyboard to achieve control of the gestures on key positions of the keyboard. However, the method can only achieve input of characters by controlling the keyboard through the gestures, but cannot achieve the input of characters through stroke traces using the gestures. In contrast, in the embodiments of the present disclosure, the input of the stroke traces of characters may be achieved through gestures, so that the input of the characters is more convenient, rapid and practical.

In another example, in an input method based on gesture recognition, a certain portion of a hand is adopted as a pen tip to make continuous stroke drawing on an interactive interface of an electronic device such as a screen of a display, and then a character recognition is performed on the stroke trace generated to obtain the corresponding character. However, the stroke trace formed by this method is a complete and continuous stroke trace, that is, a plurality of strokes of the character are continuous, which seriously affects a display effect of the stroke trace and a recognition accuracy of the character. In contrast, in the embodiments of the present disclosure, a mid-air writing is achieved through gestures, and discontinuities among a plurality of stroke traces is also achieved, so that the stroke traces are more similar to the actual strokes of the character, thereby improving the recognition accuracy of the character.

In addition, since in the method provided by the embodiments of the present disclosure, the discontinuities among a plurality of stroke traces is achieved, even if the user inputs a plurality of characters at one time, the method provided by the embodiments of the present disclosure may conveniently achieve the recognition of each stroke trace of the characters, so as to obtain the characters. Compared with a method that may only achieve an input of a single character, in the method provided by the embodiments of the present disclosure, the continuous input may be performed conveniently and rapidly, thereby improving an input efficiency and enhancing a practicability of handwriting input.

Figure 3:
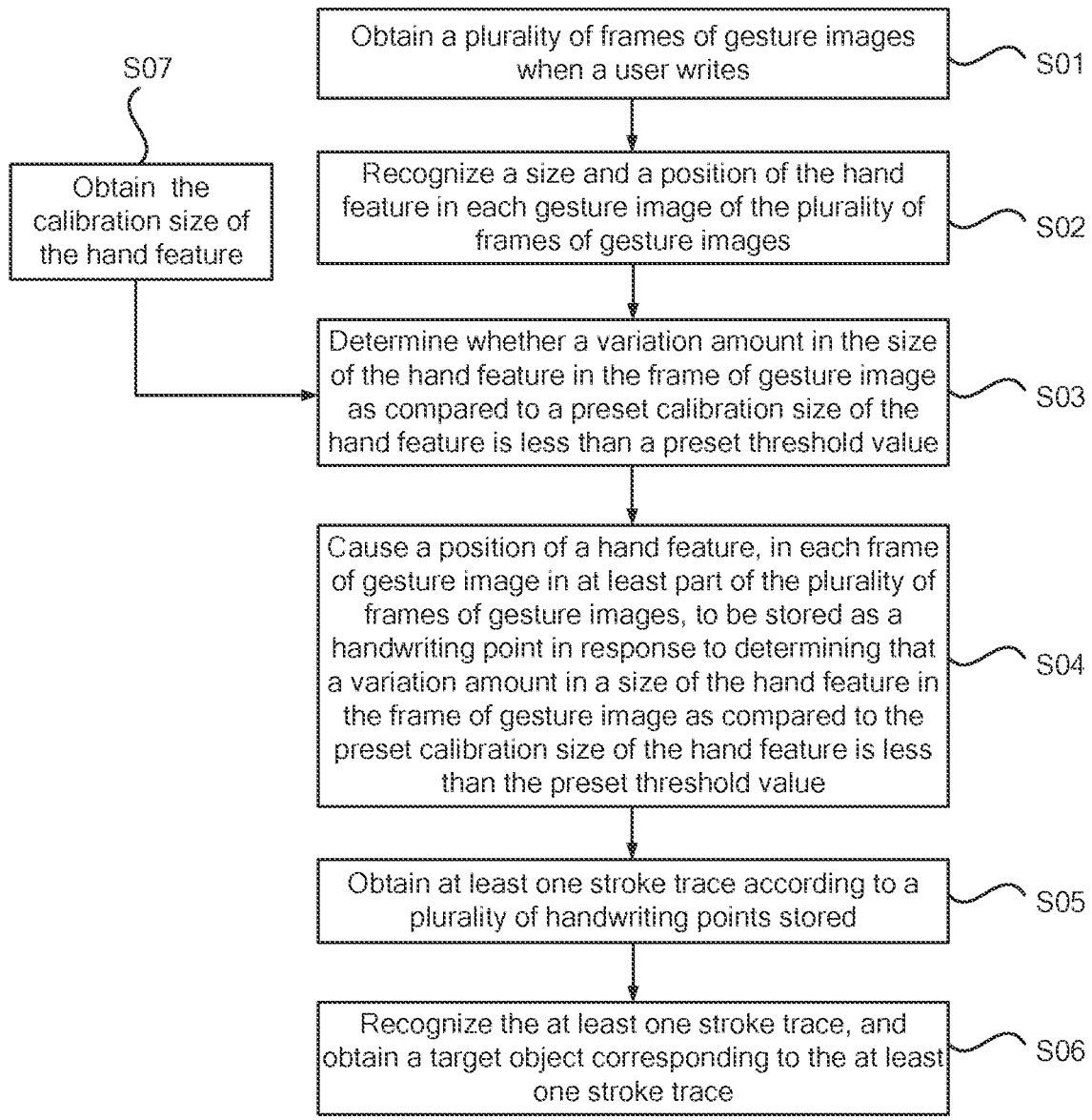
FIG. 3 is a schematic flow diagram of another input method based on visual recognition, in accordance with some embodiments.

In some embodiments, as shown in FIG. 3, before S03, the method further includes step 07 (S07).

In S07, the processor obtains the calibration size of the hand feature.

In the embodiments of the present disclosure, since the processor determines whether the user makes the "lifting pen" motion during gesture input according to whether a variation amount in a size of the hand feature in each frame of gesture image as compared to the preset calibration size of the hand feature is less than the preset threshold value, and determines whether the stroke trace is continuous, the determination of the calibration size of the hand feature also substantially determines an effective writing distance (i.e., an effective writing space) of the user. That is, the user may achieve the input of the gesture writing only when making the gesture in the effective writing space.

For example, before the user makes the gesture input, the processor needs to obtain the calibration size of the hand feature to determine the effective writing space of the user.

It will be noted that, in the embodiments of the present disclosure, the processor may also perform S07 before performing S01 or S02, or perform S07 while performing S01 or S02 as long as the processor performs S03 after performing S07.

Figure 4:
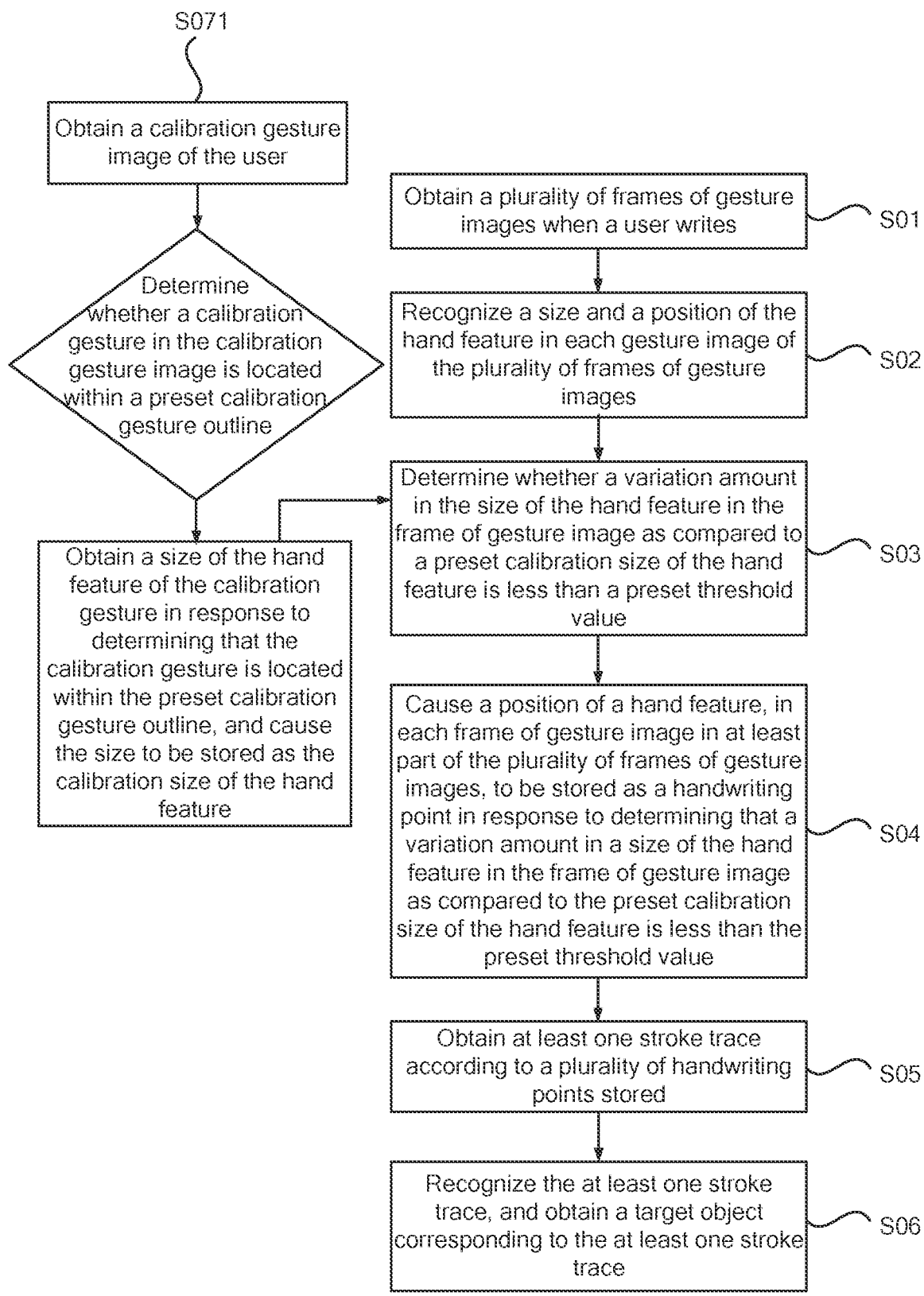
FIG. 4 is a schematic flow diagram of yet another input method based on visual recognition, in accordance with some embodiments.

In some examples, as shown in FIG. 4, S07 includes step 071 to step 073 (S071 to S073).

In S071, the processor obtains a calibration gesture image of the user.

In S072, the processor determines whether a calibration gesture in the calibration gesture image is located within a preset calibration gesture outline.

In S073, the processor obtains a size of the hand feature of the calibration gesture in response to determining that the calibration gesture in the calibration gesture image is located within the preset calibration gesture outline, and causes the size to be stored as the calibration size of the hand feature.

Figure 5:
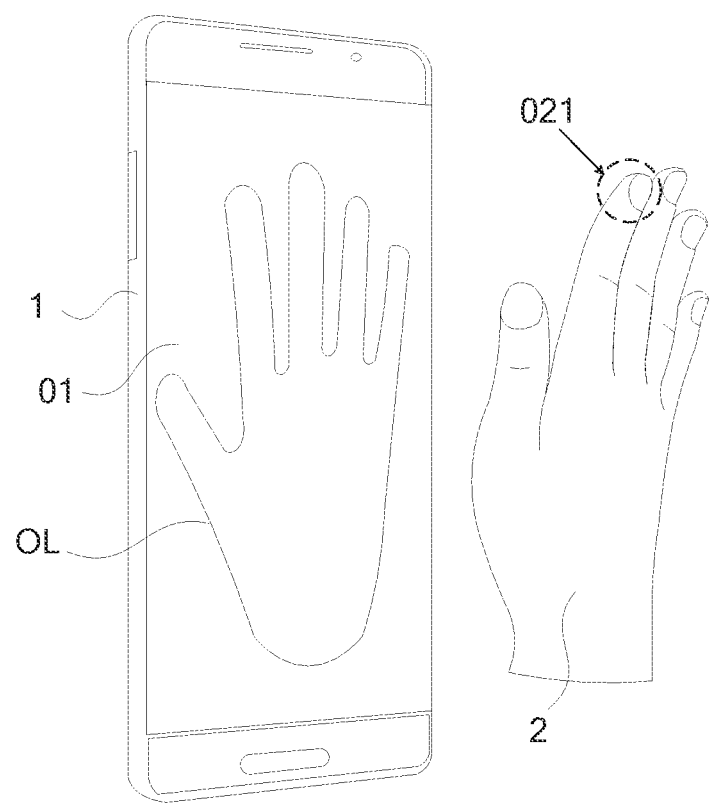
FIG. 5 is a schematic diagram illustrating a user making a calibration gesture within a calibration gesture outline, in accordance with some embodiments.

For example, as shown in FIG. 5, the preset calibration gesture outline OL is displayed on a display page 01 of the display in the electronic device 1. The calibration gesture outline OL is, for example, a virtual palm outline with a fixed size, and the calibration gesture is, for example, a gesture with a palm, of the hand 2 of the user, facing towards the display page 01. The electronic device 1 may prompt the user to place the palm within the calibration gesture outline OL through voice and/or text. After detecting that the user places the palm within the calibration gesture outline, the processor obtains a size of the hand feature of the calibration gesture of the user at the current position, e.g., an average width of the index finger tip 021, through a gesture recognition algorithm, and causes the size to be stored as the calibration size of the hand feature.

It will be noted that, placing the palm within the calibration gesture outline OL by the user means that, when the user places the palm at a corresponding position in front of the display page 01, the image of the palm captured by the electronic device 1 is processed by the gesture recognition algorithm, and then the palm is determined to be within the calibration gesture outline OL, it does not mean that the palm is directly in contact with the display page 01.

For example, the gesture recognition algorithm is a gesture recognition algorithm based on convolutional neural network (CNN). For example, the processor adopts a single shot multibox detector (SSD) model to determine whether the calibration gesture in the calibration gesture image is located within the preset calibration gesture outline and detect the average width of the index finger tip.

In some examples, the processor may store the result after performing S071 to S073 as a demarcated state. In this way, when the user does not write for a long time, that is, when the processor does not obtain the gesture image when the user writes for a long time, before processing one frame of gesture image obtained, the processor determines whether the calibration size of the hand feature is obtained first, and then performs S071 to S073 again in response to determining that the calibration size of the hand feature is obtained. In this way, it is ensured that the user writes in the effective writing space determined by the preset calibration size of the hand feature when writing every time, so that an accuracy of the processor in performing S03 may be improved.

In some examples, the variation amount in the size of the hand feature in a frame of gesture image as compared to the preset calibration size of the hand feature may be a difference between the size of the hand feature in the frame of gesture image and the preset calibration size of the hand feature, or may also be a ratio of the size of the hand feature in the frame of gesture image to the preset calibration size of the hand feature, which is not limited in the embodiments of the present disclosure, as long as the variation amount can represent the difference between the size of the hand feature in the frame of gesture image and the preset calibration size of the hand feature.

Based on this, the preset threshold value may be set according to actual needs. For example, in a case where the variation amount in the size of the hand feature in a frame of gesture image as compared to the preset calibration size of the hand feature is the difference between the size of the hand feature and the preset calibration size of the hand feature, for example, the preset threshold value is set to 10%, the processor determines whether to perform S04 according to whether a ratio of an absolute value of a difference value between the size of the hand feature in the frame of gesture image and the preset calibration size of the hand feature to the preset calibration size of the hand feature is less than 10%.

For example, in a case where the variation amount in the size of the hand feature in a frame of gesture image as compared to the preset calibration size of the hand feature is the ratio of the size of the hand feature in the frame of gesture image to the preset calibration size of the hand feature, for example, the preset threshold value is set to Q, the processor determines whether to perform S04 according to whether the ratio of the size of the hand feature in the frame of gesture image to the preset calibration size of the hand feature is less than Q.

In either case, the setting of the preset threshold value has a certain effect on determining whether there is a position of the hand feature corresponding to a handwriting point in a frame of gesture image. That is, the preset threshold value has a certain effect on determining whether the stroke trace is continuous. Therefore, the setting of the preset threshold value needs to be determined according to a distance between a lifted height of the pen tip and a paper in a pen lifting motion before the next stroke is made and after one stroke is finished when the user writes (for example, the user writes with a pencil), for example, on a paper in reality, so that the method provided by the embodiments of the present disclosure more accurately simulates a real writing state of the user, and the recognition accuracy of the character and the input efficiency may be improved.

In some embodiments, in S05, the processor obtaining a stroke trace of the at least one stroke trace includes step 051 (S051) and step 052 (S052).

In S051, the processor determines a starting point of the stroke trace.

In S052, the processor determines an ending point of the stroke trace.

In the embodiments of the present disclosure, the starting point and the ending point of a stroke trace may be determined according to an existence or inexistence of a position of the hand feature corresponding to a handwriting point in each of two consecutive frames of gesture images.

In some examples, S051 includes step 0511 (S0511) and step 0512 (S0512).

In S0511, the processor determines whether there is a position of the hand feature corresponding to a handwriting point in a previous frame of gesture image adjacent to any frame of frames of gesture images corresponding to the plurality of handwriting points.

In S0512, in response to determining that there is not the position of the hand feature corresponding to the handwriting point in the previous frame of gesture image, the processor determines that a handwriting point corresponding to the position of the hand feature in the frame of gesture image is the starting point of the stroke trace.

That is, the processor determines that there is the position of the hand feature corresponding to the handwriting point in the current frame of gesture image, and there is not the position of the hand feature corresponding to the handwriting point in the previous frame adjacent to the current frame of gesture image, which indicates that the user is making the "lifting pen" motion when the camera captures the previous frame adjacent to the current frame of gesture image, and the user starts to write when the camera captures the current frame of gesture image. Therefore, the processor determines the handwriting point corresponding to the position of the hand feature in the current frame of gesture image as a starting point of a stroke trace, i.e., a starting point of a new stroke trace to be generated including the handwriting point.

Herein, it will be noted that, in a case where there is a position of the hand feature corresponding to a handwriting point in a first frame of gesture image obtained by the processor, the handwriting point is a starting point of a stroke trace including the handwriting point.

For example, as shown in FIG. 2A, the processor determines that there is a position of the hand feature corresponding to a handwriting point in each of the 1st frame to the 5th frame, and the 8th frame to the 10th frame of the ten frames of gesture images obtained. That is, since the processor determines that there is a position of the hand feature corresponding to a handwriting point in a previous frame adjacent to the 2nd frame of gesture image, i.e., the 1st frame of gesture image, the processor determines that the handwriting point corresponding to the position of the hand feature in the 2nd frame of gesture image is not a starting point of the stroke trace T1 including the handwriting point. Similarly, since the processor determines that there is not a position of the hand feature corresponding to a handwriting point in a previous frame adjacent to the 8th frame of gesture image, i.e., the 7th frame of gesture image, the processor determines that the handwriting point corresponding to the position of the hand feature in the 8th frame of gesture image is a starting point (represented as SP in FIG. 2A) of the stroke trace T2 including the handwriting point.

Herein, it will be noted that, in a case where there is a position of the hand feature corresponding to a handwriting point in the 1st frame of gesture image obtained by the processor, the handwriting point corresponding to the position of the hand feature in the 1st frame of gesture image is a starting point of a stroke trace including the handwriting point. For example, as shown in FIG. 2A, the 1st frame of gesture image is the first frame of gesture image obtained by the processor, and there is the position of the hand feature corresponding to the handwriting point in the frame of gesture image, and thus the handwriting point is the starting point of the first stroke trace T1 (represented as SP in FIG. 2A).

In some examples, S052 includes step 0521 (S0521) and step 0522 (S0522).

In S0521, the processor determines whether there is a position of the hand feature corresponding to a handwriting point in the next frame of gesture image adjacent to any frame of frames of gesture images corresponding to the plurality of handwriting points.

In S0522, in response to determining that there is not the position of the hand feature corresponding to the handwriting point in the next frame of gesture image, the processor determines that a handwriting point corresponding to a position of the hand feature in the frame of gesture image is the ending point of the stroke trace.

That is, the processor determines that there is the position of the hand feature corresponding to the handwriting point in the current frame of gesture image, and there is not the position of the hand feature corresponding to the handwriting point in the next frame adjacent to the current frame of gesture image, which indicates that the user is writing when the camera captures the current frame of gesture image, and makes the "lifting pen" motion when the camera captures the next frame adjacent to the current frame of gesture image. Therefore, the processor determines the handwriting point corresponding to the position of the hand feature in the current frame of gesture image as the ending point of a stroke trace.

For example, as shown in FIG. 2A, the processor determines that there is the position of the hand feature corresponding to the handwriting point in each of the 1st frame to the 5th frame, and the 8th frame to the 10th frame of the ten frames of gesture images obtained. That is, since the processor determines that there is not a position of the hand feature corresponding to a handwriting point in a next frame adjacent to the 5th frame of gesture image, i.e., the 6th frame of gesture image, the processor determines that the handwriting point corresponding to the position of the hand feature in the 5th frame of gesture image is the ending point (represented as EP in FIG. 2A) of the stroke trace T1 including the handwriting point. Similarly, since the processor determines that there is a position of the hand feature corresponding to a handwriting point in a next frame adjacent to the 9th frame of gesture image, i.e., the 10th frame of gesture image, the processor determines that the handwriting point corresponding to the position of the hand feature in the 9th frame of gesture image is not the ending point of the stroke trace T2 including the handwriting point.

Herein, it will be noted that, in a case where there is the position of the hand feature corresponding to the handwriting point in a last frame of gesture image obtained by the processor, the handwriting point corresponding to the position of the hand feature in the last frame of gesture image is the ending point of a stroke trace including the handwriting point. For example, as shown in FIG. 2A, the 10th frame of gesture image is the last frame of gesture image obtained by the processor, and there is the position of the hand feature corresponding to the handwriting point in the frame of gesture image, and thus the handwriting point corresponding to the position of the hand feature in the 10th frame of gesture image is the ending point of the second stroke trace T2 (represented as EP in FIG. 2A).

In some examples, based on the method for determining the starting and ending points of a stroke trace by the processor, in S05, the processor obtaining a plurality of stroke traces according to the stored plurality of handwriting points includes steps 053 to 057 (S053 to S057).

In S053, the processor determines whether there is a position of the hand feature corresponding to a handwriting point in a previous frame adjacent to a certain frame of frames of gesture images corresponding to the plurality of handwriting points.

In S054, if the processor determines that there is the position of the hand feature corresponding to the handwriting point in the previous frame adjacent to the certain frame of gesture image, it indicates that the user is writing a certain stroke when the camera captures the previous frame of gesture image. That is, the processor is obtaining at least portion of a stroke trace corresponding to the stroke. In this case, in response to determining that there is the position of the hand feature corresponding to the handwriting point in the previous frame adjacent to the certain frame of gesture image, the processor continues to determine whether there is the position of the hand feature corresponding to the handwriting point in the certain frame of gesture image.

In S055, if the processor determines that there is the position of the hand feature corresponding to the handwriting point in the certain frame of gesture image, it indicates that the user continues writing the stroke when the camera captures the certain frame of gesture image. That is, the processor continues to obtain a portion of the stroke trace corresponding to the stroke. In this case, in response to determining that there is the position of the hand feature corresponding to the handwriting point in the previous frame adjacent to the certain frame of gesture image, and there is the position of the hand feature corresponding to the handwriting point in the certain frame of gesture image, the processor causes handwriting points, corresponding to positions of hand features in the two frames (i.e., the certain frame and the previous frame) of gesture images, to be connected to one and another, and obtains at least portion of the stroke trace corresponding to the stroke.

In S056, if the processor determines that there is a position of the hand feature corresponding to a handwriting point in each of the plurality of consecutive frames of gesture images, it means that the user is writing the stroke all the time. In this case, in responds to determining that there is the position of the hand feature corresponding to the handwriting point in each of the plurality of consecutive frames of gesture images, the processor causes handwriting points, in the plurality of consecutive frames of gesture images, to be connected to one and another, and obtains the stroke trace corresponding to the stroke.

In S057, if the processor determines that there is not the position of the hand feature corresponding to the handwriting point in the previous frame adjacent to the certain frame of the gesture image, it indicates that the user does not write when the camera captures the previous frame of gesture image. That is, the processor has not obtained a gesture image that the user is writing. Or, the processor determines that a variation amount in a size of the hand feature (e.g., an average width of index finger tip) in the previous frame of gesture image as compared to the preset calibration size of the hand feature is greater than or equal to the preset threshold value, which means that the user makes the "lifting pen" motion when the camera captures the previous frame of gesture image. In this case, regardless of determining whether there is the position of the hand feature corresponding to the handwriting point in the certain frame of gesture image, the processor will not obtain a stroke trace between the previous frame adjacent to the certain frame of the gesture image and the certain frame of gesture image, so that an interruption of the stroke trace may be achieved. As a result, the processor may obtain a plurality of stroke traces.

In some examples, whether there is a position of the hand feature corresponding to a handwriting point in each frame of gesture image may be marked through a preset detection state. For example, in response to determining that there is the position of the hand feature corresponding to the handwriting point in a certain frame of gesture image, the processor marks a detection state corresponding to the frame of gesture image as a stroke-writing state. In response to determining that there is not the position of the hand feature corresponding to the handwriting point in a certain frame of gesture image, the processor marks the detection state corresponding to the frame of gesture image as a non-stroke-writing state, or does not mark the detection state.

In this way, the processor may directly obtain a detection state corresponding to the previous frame adjacent to the current frame of the gesture image, and determine whether it is possible to obtain at least portion of a stroke trace in response to determining whether there is the position of the hand feature corresponding to the handwriting point in the current frame of gesture image, and in response to the obtained detection state corresponding to the previous frame of the current frame of gesture image.

For example, in response to determining that the detection state corresponding to the previous frame adjacent to the current frame of gesture image is the stroke-writing state, and determining that there is the position of the hand feature corresponding to the handwriting point in the current frame of gesture image, the processor causes the handwriting point corresponding to the position of the hand feature in the previous frame adjacent to the current frame of gesture image and the handwriting point corresponding to the position of the hand feature in the current frame of gesture image, to be connected to each other, so as to form at least portion of a stroke trace, and marks the detection state corresponding to the current frame of gesture image as the stroke-writing state at the same time.

In response to determining that the detection state corresponding to the previous frame adjacent to the current frame of gesture image is the stroke-writing state, and determining that there is not the position of the hand feature corresponding to the handwriting point in the current frame of gesture image, the processor stops obtaining the stroke trace. At the same time, the processor marks the detection state corresponding to the current frame of gesture image as the non-stroke-writing state, or does not mark the detection state.

In response to determining that the detection state corresponding to the previous frame adjacent to the current frame of gesture image is not the stroke-writing state, that is, in response to determining that the detection state corresponding to the previous frame adjacent to the current frame of gesture image is the non-stroke-writing state, or, in response to determining that there is not a corresponding detection state in the previous frame adjacent to the current frame of gesture image, and there is the position of the hand feature corresponding to the handwriting point in the current frame of gesture image, the processor marks the detection state corresponding to the current frame of gesture image as the stroke-writing state. This means that the user starts making effective writing when the camera captures the current frame of gesture image.

In response to determining that the detection state corresponding to the previous frame adjacent to the current frame of gesture image is not the stroke-writing state, and determining that there is not the position of the hand feature corresponding to the handwriting point in the current frame of gesture image, the processor stops obtaining the stroke trace. At the same time, the processor marks the detection state corresponding to the current frame of gesture image as the non-stroke-writing state, or does not mark the detection state.

For example, when the detection state is adopted to mark frames of gesture images, there is no need to mark each frame of gesture image separately. For example, only in response to determining that a result that whether there is the position of the hand feature corresponding to the handwriting point in the current frame of the gesture image is different from a result that whether there is the position of the hand feature corresponding to the handwriting point in the previous frame adjacent to the current frame of gesture image, the processor updates the marked detection state corresponding to the previous frame of gesture image. For example, the detection state corresponding to the previous frame of gesture image is not marked, and the detection state corresponding to the current frame of gesture image is marked as the stroke-writing state; or the detection state of the previous frame of gesture image is marked as the stroke-writing state, and the detection state corresponding to the current frame of gesture image is marked as the non-stroke-writing state. In response to determining that the result that whether there is the position of the hand feature corresponding to the handwriting point in the current frame of the gesture image is the same as the result that whether there is the position of the hand feature corresponding to the handwriting point in the previous frame adjacent to the current frame of gesture image, the processor maintains the detection state corresponding to the previous frame of gesture image. That is, the processor causes the detection state corresponding to the previous frame of gesture image to be cached, so that the detection state corresponding to the current frame of gesture image is the same as the detection state corresponding to the previous frame of gesture image.

For example, as shown in FIG. 2A, in response to determining that there is the position of the hand feature corresponding to the handwriting point in the 1st frame of gesture image, the processor marks the detection state corresponding to the frame of gesture image as the stroke-writing state. In response to determining that there is the position of the hand feature corresponding to the handwriting point in the 2nd frame of gesture image, and determining that the detection state corresponding to the 1st frame of gesture image is the stroke-writing state, the processor causes the handwriting point corresponding to the position of the hand feature in the 2nd frame of gesture image and the handwriting point corresponding to the position of the hand feature in the 1st frame of gesture image to be connected each other, so as to obtain a portion of a stroke trace, i.e., a portion of the first stroke trace T1. At the same time, the processor continues to cause the detection state corresponding to the 2nd frame of gesture image to be cached as the stroke-writing state, that is, the processor does not update the cached detection state corresponding to the 1st frame of gesture image, or does not clear the cached detection state corresponding to the 1st frame of gesture image.

For example, as shown in FIG. 2A, in response to determining that there is not the position of the hand feature corresponding to the handwriting point in the 6th frame of gesture image, and determining that the detection state corresponding to the 5th frame of gesture image is the stroke-writing state, the processor stops obtaining a stroke trace, and causes the stroke trace to be cached. At the same time, the processor updates the detection state corresponding to the 6th frame of gesture image as the non-stroke-writing state, or clears the cached detection state corresponding to the 5th frame of gesture image directly.

For example, as shown in FIG. 2A, in response to determining that there is not the position of the hand feature corresponding to the handwriting point in the 7th frame of gesture image, and determining that the cached detection state corresponding to the 6th frame of gesture image is not the stroke-writing state, the processor does not update the cached detection state corresponding to the 6th frame of gesture image, or does not clear the cached detection state corresponding to the 6th frame of gesture image.

For example, as shown in FIG. 2A, in response to determining that there is the position of the hand feature corresponding to the handwriting point in the 8th frame of gesture image, and determining that the cached detection state corresponding to the 7th frame of gesture image is not the stroke-writing state, the processor starts to obtain a stroke trace, and updates the detection state corresponding to the 8th frame of gesture image into the stroke-writing state.

In some examples, in response to determining that there is the position of the hand feature corresponding to the handwriting point in the current frame of gesture image, and there is not a position of the hand feature corresponding to a handwriting point in each of the previous frame and the next frame adjacent to the current frame of gesture image, the processor clears the handwriting point corresponding to the position of the hand feature in the current frame of gesture image.

In the embodiments of the present disclosure, if the processor determines that there is not the position of the hand feature corresponding to the handwriting point in each of the previous frame and the next frame that are adjacent to the current frame of gesture image, and there is a position of the hand feature corresponding to a handwriting point in the current frame of gesture image, it means that the hand feature (e.g., the index finger tip) of the user is in the effective writing space only when the camera captures the current frame of gesture image, and the finger of the user is not in the effective writing space when the camera captures the two adjacent frames of gesture images. In this case, since a frame rate of the camera is high, such as approximately 33 frames per second, it may be considered that the handwriting point corresponding to the position of the hand feature in the current frame of gesture image is a non-effective handwriting point. Therefore, in response to determining that there is the position of the hand feature corresponding to the handwriting point in the current frame of gesture image, and there is not the position of the hand feature corresponding to the handwriting point in each of the previous frame and the next frame, the processor clears the handwriting point corresponding to the current frame of gesture image, so as to improve an accuracy of the stroke trace obtained and improve the recognition accuracy.

Figure 6:
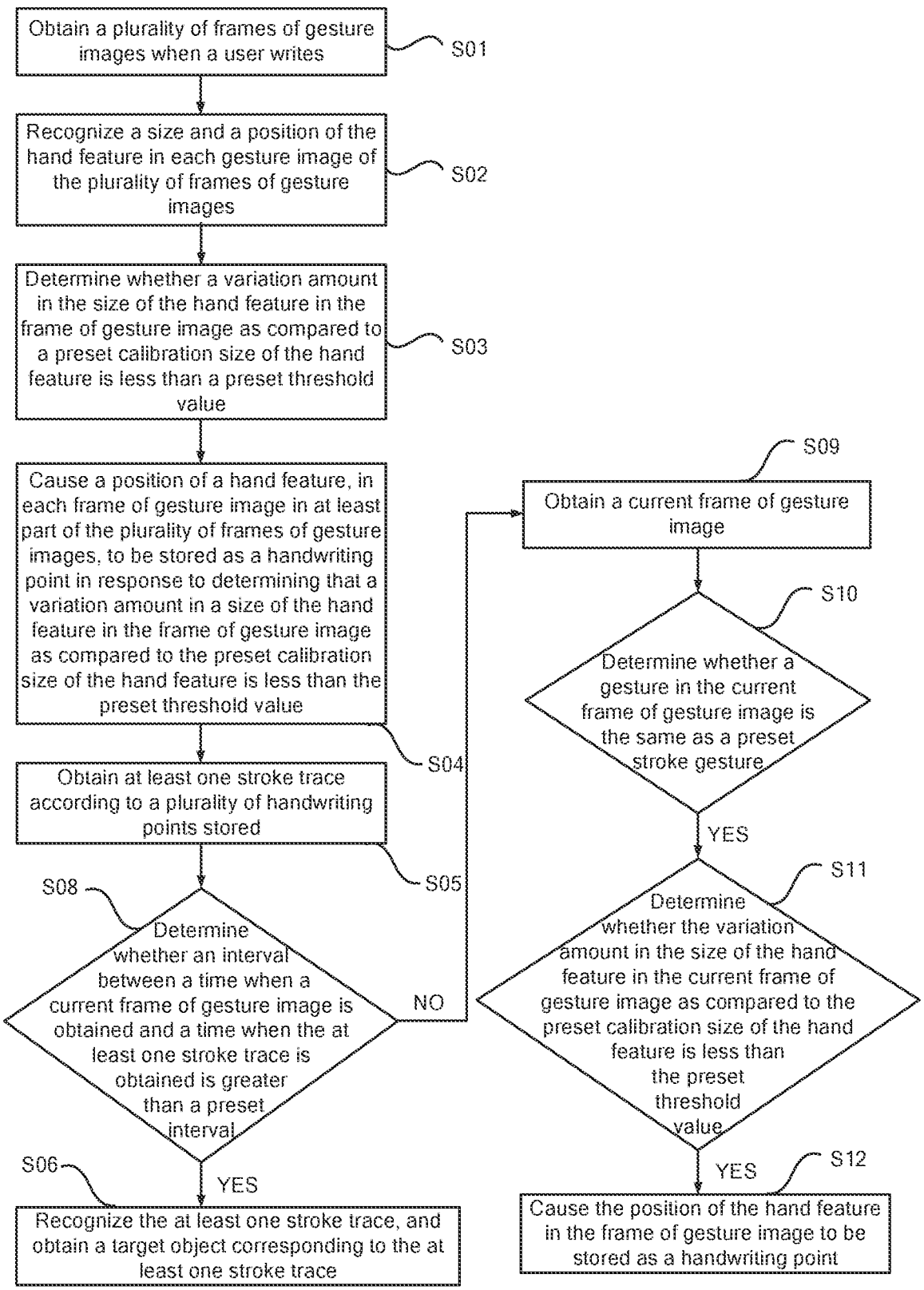
FIG. 6 is a schematic flow diagram of yet another input method based on visual recognition, in accordance with some embodiments.

In some embodiments, as shown in FIG. 6, after S05 and before S06, the method further includes step 08 (S08).

In S08, the processor determines whether an interval between a time when a current frame of gesture image is obtained and a time when the at least one stroke trace is obtained is greater than a preset interval.

Herein, the time when the at least one stroke trace is obtained is a time when a frame of gesture image corresponding to a last handwriting point of the at least one stroke trace is obtained.

In response to determining that the interval between the time when the current frame of gesture image is obtained and the time when the at least one stroke trace is obtained is greater than the preset interval, the processor performs S06, i.e., recognizes the at least one stroke trace.

In the embodiments of the present disclosure, a value of the preset interval is not limited, and the value of the preset interval may be set to any value according to the writing habit of the user, for example, it is set to one second. The writing habit is, for example, a time during which the user pauses between every two adjacent strokes when writing different strokes continuously.

In the embodiments of the present disclosure, after the user pauses for more than the preset interval without making the stroke writing, it indicates that the user has finished the writing. In this case, the processor may recognize the at least one stroke trace that has been obtained, and obtain a target object corresponding to the at least one stroke trace.

Therefore, as shown in FIG. 2A, the processor obtains the 1st stroke trace T1 and the 2nd stroke trace T2 according to the first ten frames of gesture images obtained. Moreover, according to a plurality of frames of (e.g., forty frames) gesture images continuously obtained after the 10th frame, the processor determines that a variation amount in a size of the hand feature in each of the plurality of frames of gesture images as compared to the preset calibration size of the hand feature is greater than or equal to the preset threshold value. That is, the processor determines that there is not a position of the hand feature corresponding to a handwriting point in each of the plurality of frames of gesture images.

In this case, if an interval between a time when, for example, a fiftieth frame (50th) of gesture image is obtained and times when the first stroke trace T1 and the second stroke trace T2 are obtained is greater than the preset interval, the processor starts to recognize the first stroke trace T1 and the second stroke trace T2. Herein, a time when a frame of gesture image corresponding to the last handwriting point of the first stroke trace T1 and the second stroke trace T2 is obtained is a time when the 10th frame of gesture image is obtained by the processor.

For another example, as shown in FIG. 2C, the processor obtains the fourth stroke trace T4, the fifth stroke trace T5 and the sixth stroke trace T6 according to the first 39 frames of gesture images obtained by the processor. Moreover, according to a plurality of frames of (e.g., 50 frames) gesture images continuously obtained after the thirty-ninth frame (39th frame) obtained by the processor, the processor determines that the variation amount in the size of the hand feature in each of the plurality of frames of gesture images as compared to the preset calibration size of the hand feature is greater than or equal to the preset threshold value. That is, the processor determines that there is not the position of the hand feature corresponding to the handwriting point in each of the plurality of frames of gesture images.

In this case, if the interval between a time when, for example, the eighty-ninth frame of gesture image is obtained and the time when the fourth stroke trace T4, the fifth stroke trace T5 and the sixth stroke trace T6 are obtained is greater than the preset interval, the processor starts to recognize the fourth stroke trace T4, the fifth stroke trace T5 and the sixth stroke trace T6. Herein, a time when a frame of gesture image corresponding to the last handwriting point of the fourth stroke trace T4, the fifth stroke trace T5 and the sixth stroke trace T6 is obtained is the time when the 39th frame of gesture image is obtained by the processor.

In this way, the user may continuously write strokes of a plurality of characters, and the processor only needs to recognize the strokes written by the user once to obtain the characters, thereby effectively improving the input efficiency.

In some embodiments, as shown in FIG. 6, in a case where the processor determines that the interval between the time when the current frame of gesture image is obtained and a time when the at least one stroke trace in S05 is obtained is less than or equal to the preset interval, the method further includes step 09 (S09) to step 12 (S12).

In S09, the processor obtains a current frame of gesture image.

In S10, the processor determines whether a gesture in the current frame of gesture image is the same as a preset stroke gesture.

Figure 7:
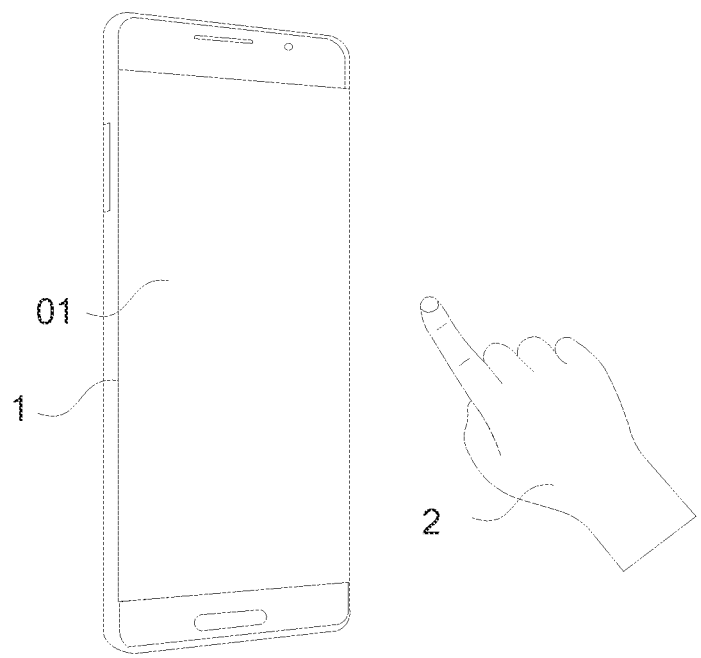
FIG. 7 is a schematic diagram illustrating a user making a single pointing gesture in front of a display page, in accordance with some embodiments.

For example, the preset stroke gesture is a single pointing gesture. As shown in FIG. 7, the single pointing gesture is, for example, a gesture in which the index finger of the user 2 is erected. For example, the single pointing gesture may be made by holding the index finger straight or relaxing the index finger away from the palm, bending other fingers towards the palm, and pointing the index finger to the display page 01 of the electronic device 1.

In S11, in response to determining that the gesture in the current frame of gesture image is the same as the preset stroke gesture, the processor determines whether the variation amount in the size of the hand feature in the current frame of gesture image as compared to the preset calibration size of the hand feature is less than the preset threshold value.

In the embodiments of the present disclosure, S11 is similar to S03, and details are not described herein again.

In S12, in response to determining that the variation amount in the size of the hand feature in the current frame of gesture image as compared to the preset calibration size of the hand feature is less than the preset threshold value, the processor causes the position of the hand feature in the frame of gesture image to be stored as a handwriting point.

In the embodiments of the present disclosure, S12 is similar to S04, and details are not described herein again.

In some examples, the preset stroke gesture (e.g., the single pointing gesture) may also be used as a gesture for the processor to confirm that the user starts to write. For example, in response to determining that a gesture in an obtained gesture image is the same as the preset stroke gesture, the processor starts to perform S02, and causes a display to display a gesture input interface (i.e., the display page 01).

In some other examples, a voice recognition manner may also be used to make the user start to write. For example, the user utters a voice of "start handwriting input", and the processor causes the display to display the gesture input interface in response to receiving and recognizing the voice signal. At this time, the user may start to write.

Figure 8:
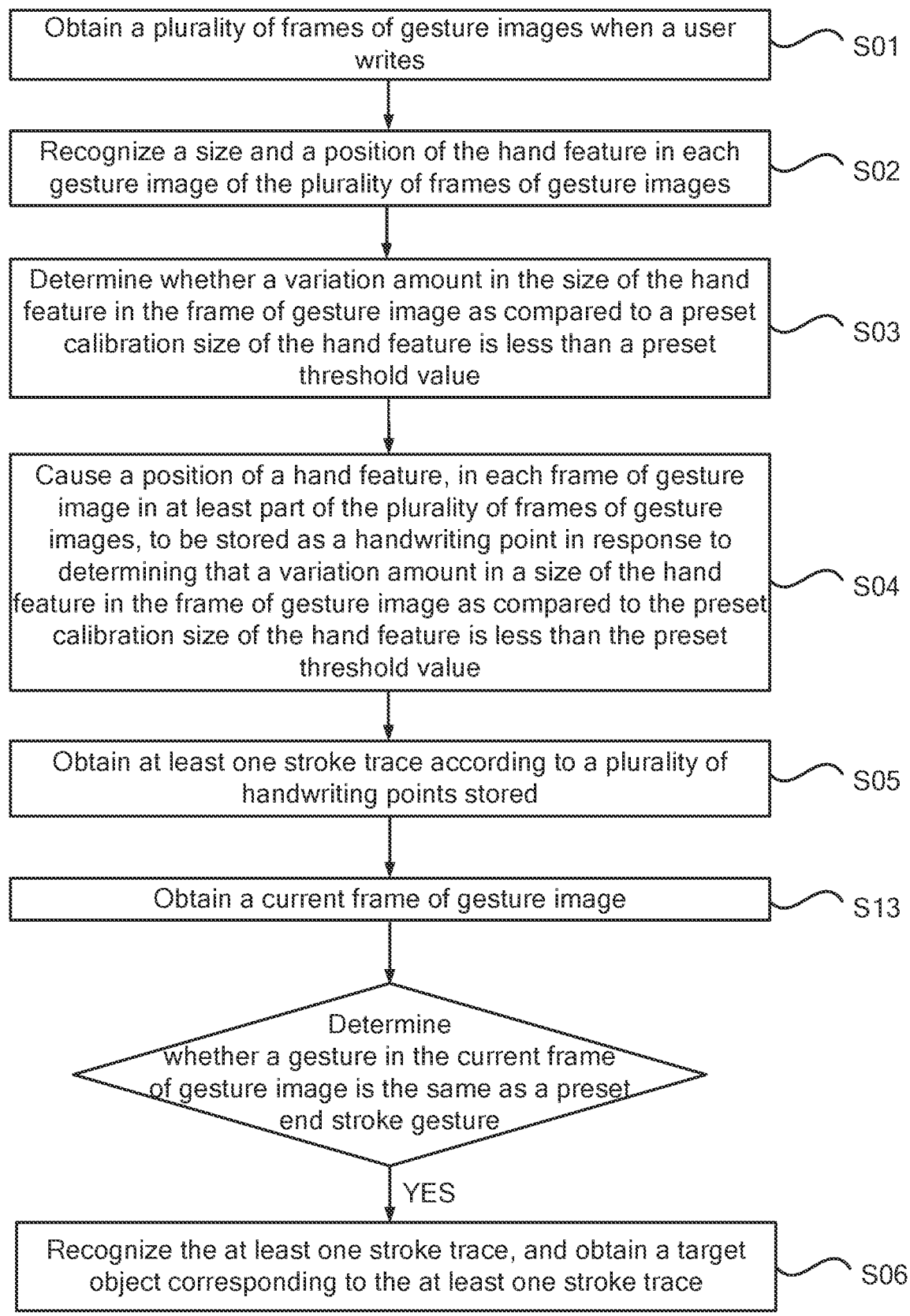
FIG. 8 is a schematic flow diagram of yet another input method based on visual recognition, in accordance with some embodiments.

In some embodiments, as shown in FIG. 8, after S05 and before S06, the method further includes step 13 (S13) and step 14 (S14).

In S13, the processor obtains a current frame of gesture image.

In S14, the processor determines whether a gesture in the current frame of gesture image is the same as a preset end stroke gesture.

Figure 9:
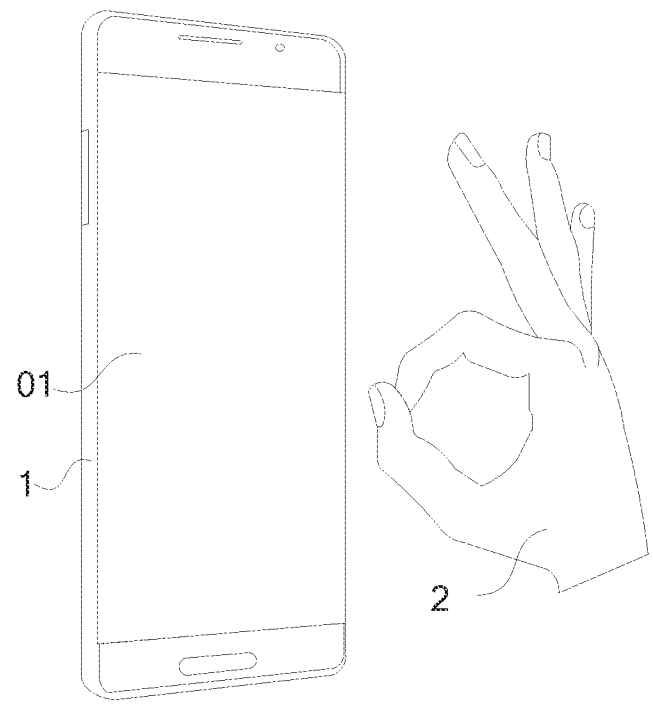
FIG. 9 is a schematic diagram illustrating a user making an OK gesture in front of a display page, in accordance with some embodiments.

For example, the preset end stroke gesture is an OK gesture as shown in FIG. 9. In FIG. 9, the hand of the user is represented as 2. The OK gesture is made by contacting end of the thumb with end of index to form a circle, holding the other fingers straight or relaxing the other fingers away from the palm, and making the palm face towards the display page 01 of the electronic device 1.

In response to determining that the gesture in the current frame of gesture image is the same as the preset end stroke gesture, the processor performs S06, i.e., recognizes the at least one stroke trace obtained in S05.

In some other examples, it is possible to make the processor perform S06 through voice recognition. For example, the user utters a voice of "end handwriting input", and the processor starts to perform S06 in response to receiving and recognizing the voice signal.

In some embodiments, S06 includes step 061 (S061) and step 062 (S062).

In S061, the processor recognizes the at least one stroke trace obtained, and obtains a plurality of candidate target objects corresponding to the at least one stroke trace.

In the embodiments of the present disclosure, specific steps of the method for the processor to recognize the obtained at least one stroke trace are not limited, as long as a recognition purpose may be achieved.

For example, there is a database stored in the electronic device provided by the embodiments of the present disclosure which includes characters of different languages, such as Chinese characters, English alphabet, Korean alphabet, German alphabet, Punctuation and so on. According to the database stored, the processor may recognize the at least one stroke trace by adopting a recurrent neural network (RNN) model to obtain a plurality of similar candidate target objects.

Figure 10:
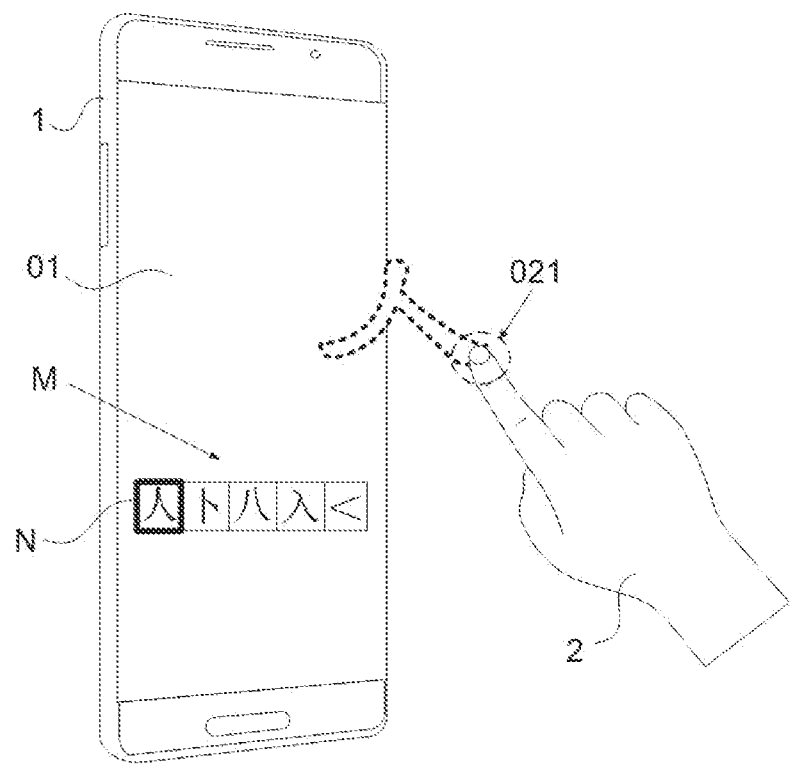
FIG. 10 is a schematic diagram illustrating a plurality of candidate target objects corresponding to a first stroke trace and a second stroke trace shown in FIG. 2A obtained by a processor, in accordance with some embodiments.

For example, as shown in FIGS. 2A and 10, the user writes the strokes of the Chinese character " 人 " by using the hand feature of the user (e.g., the index finger tip 021 of the hand 2 shown in FIG. 10) in a mid-air manner, and the processor obtains the first stroke trace T1 and the second stroke trace T2 after performing S01 to S05. Then, the processor performs S061, i.e., recognizes the first stroke trace T1 and the second stroke trace T2, to obtain a plurality of candidate target objects M corresponding to the first stroke trace T1 and the second stroke trace T2, and causes the display page 01 of the electronic device 1 to display the plurality of candidate target objects M.

In S062, the processor determines a target object from the plurality of candidate target objects.

For example, as shown in FIG. 10, the processor determines the target object from the plurality of candidate target objects M, i.e., the Chinese character " 人 ", and causes the display to display the Chinese character " 人 " in a region to be input.

In some examples, S062 includes step 0621 (S0621) an step 0622 (S0622).

In S0621, the processor continues to obtaining a plurality of consecutive frames of gesture images.

In S0622, the processor determines whether a gesture in each of the plurality of consecutive frames of gesture images is the same as a preset selection gesture.

Figure 11:
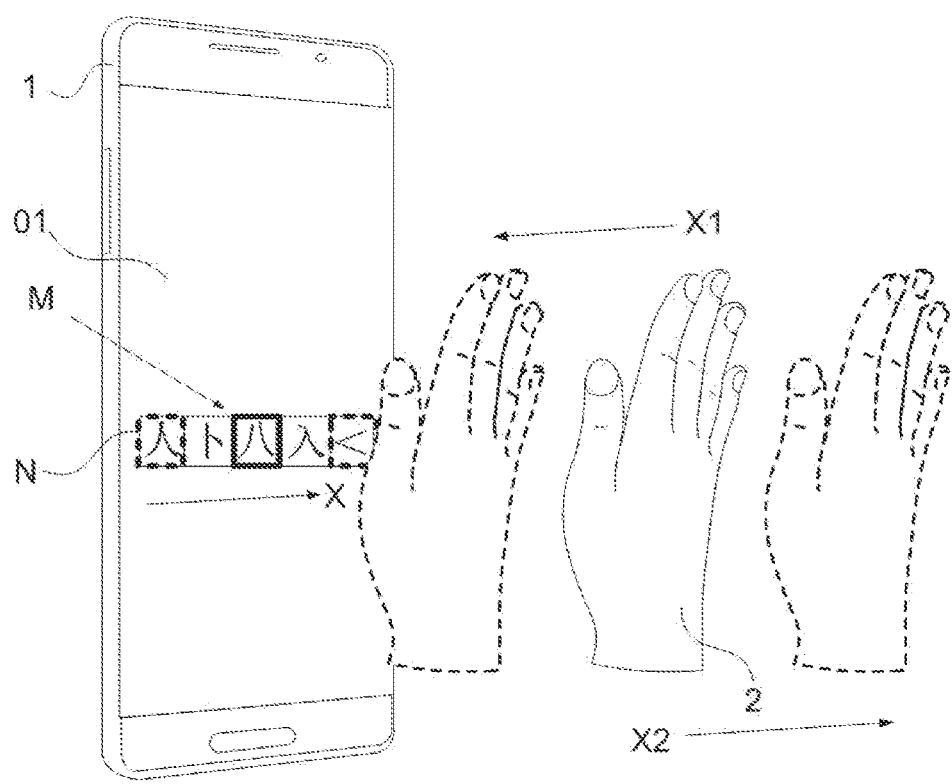
FIG. 11 is a schematic diagram illustrating a process for determining a target object from a plurality of candidate target objects by a processor, in accordance with some embodiments.

For example, the preset selection gesture is an "open" palm gesture as shown in FIG. 11. As shown in FIG. 11, the user makes the "open" palm gesture by holding all fingers straight or relaxing all the fingers away from the palm of the hand 2, and making the palm face towards the display page 01 of the electronic device 1.

In S0623, in response to determining that the gesture in each of the plurality of consecutive frames of gesture images is the same as the preset selection gesture, the processor determines the target object from the plurality of candidate target objects according to a hand position in the last frame of the plurality of consecutive frames of gesture images.

Herein, the hand position may be a position of a certain portion of the hand when the hand shows a preset selection gesture, for example, a position of the palm of the hand when the hand shows an "open" palm gesture.

For example, as shown in FIG. 11, the processor controls the display to display the plurality of candidate target objects and to display a candidate box N at the same time. In the embodiments of the present disclosure, a position of the candidate box N may be preset to be located on one of the plurality of candidate target objects M, such as the first candidate target object. In addition, the processor may cause the candidate box N to move to different candidate target objects according to a preset value D of a change of the hand position in the plurality of consecutive frames of gesture images.

Herein, as shown in FIG. 11, the change of the hand position in the plurality of consecutive frames of gesture images may be changes in a first direction X1 or a second direction X2. The first direction X1 and the second direction X2 are parallel to a direction X in which the plurality of candidate target objects are arranged, and are opposite to each other.

Based on this, as shown in FIG. 11, the user moves the hand in the first direction X1, and the processor causes the candidate box N to move from the third candidate target object to the second candidate target object in response to determining that a change value of the hand position in the plurality of consecutive frames of gesture images is equal to the preset value D, and then causes the candidate box N to continue to move from the second candidate target object to the first candidate target object in response to determining that a change value of the hand position in the plurality of consecutive frames of gesture images is equal to the preset value D, and so on. Here, in order to describe the technical solutions in some embodiments of the present disclosure more clearly, in a case where the user moves the hand in the first direction X1 in FIG. 11, the candidate box N is represented by a bold line when the candidate box N is at the third candidate target object, while the candidate box N is represented by a dotted line when the candidate box N is at the first candidate target object.

Or, as shown in FIG. 11, the user moves the hand in the second direction X2, and the processor causes the candidate box N to move from the third candidate target object to the fourth candidate target object in response to determining that the change value of the hand position in the plurality of consecutive frames of gesture images is equal to the preset value D, and then causes the candidate box N to continue to move from the fourth candidate target object to the fifth candidate target object in response to determining that the change value of the hand position in the plurality of consecutive frames of gesture images is equal to the preset value D, and so on. Here, in order to describe the technical solutions in some embodiments of the present disclosure more clearly, in a case where the user moves the hand in the second direction X2 in FIG. 11, the candidate box N is represented by the bold line when the candidate box N is at the third candidate target object, while the candidate box N is represented by a dotted line when the candidate box N is at the fifth candidate target object.

In response to determining that the gesture in each of the plurality of consecutive frames of gesture images is the same as the preset selection gesture, the processor determines the hand position in each frame of the plurality of consecutive frames of gesture images. For example, if the processor determines that the hand position in each frame of the plurality of consecutive frames of gesture images is the same, it means that the user does not move the hand in a direction (i.e., the direction X1 or direction X2) parallel to the direction X in which the plurality of candidate target objects are arranged. In this case, the processor controls the position of the candidate box N to remain unchanged, and determines that a candidate target object where the candidate box N is located is the target object. For another example, if the processor determines that the hand position in each frame of the plurality of consecutive frames of gesture images is changed, it means that the user moves the hand in a direction (i.e., the direction X1 or direction X2) parallel to the direction X in which the plurality of target objects to be selected are arranged. In this case, the processor causes the candidate box N to move to different candidate target objects according to change values of the hand positions in the plurality of consecutive frames of gesture images, so that a purpose that the processor determines the target object from a plurality of candidate target objects according to the hand position in the last frame of the plurality of consecutive frames of gesture images is achieved.

In some examples, S0623 includes step 06231 (S06231) to step 06233 (S06233).

In S06231, the processor continues to obtain at least one frame of gesture image after the last frame of the plurality of consecutive frames of gesture images.

In S06232, the processor determines whether a gesture in the at least one frame of gesture image after the last frame of the plurality of consecutive frames of gesture images is the same as a preset confirmation gesture.

Figure 12:
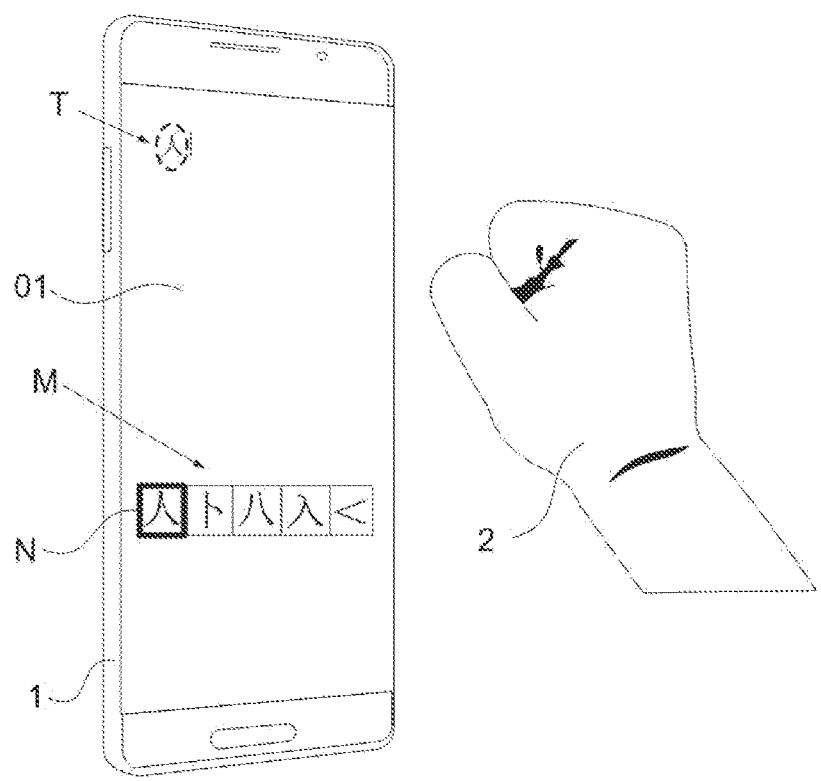
FIG. 12 is a schematic diagram illustrating a process for determining one candidate target object as a target object by a processor, and enable the target object to be displayed, in accordance with some embodiments.

For example, as shown in FIG. 12, the preset confirmation gesture is a "closed" palm gesture. As shown in FIG. 12, the user makes the "closed" palm gesture by bending all fingers toward the palm of the hand 2 into a fist and making the fingers face towards the display page 01 of the electronic device 1.

In S06233, in response to determining that the gesture in the at least one frame of gesture image after the last frame of the plurality of consecutive frames of gesture images is the same as the preset confirmation gesture, the processor determines a candidate target object corresponding to a hand position in the last frame of the plurality of consecutive frames of gesture images as the target object.

For example, the processor determines, for example, gestures in five frames of gesture images after the last frame of the plurality of consecutive frames of gesture images are the same as the preset confirmation gesture, which means that the user has finished selecting the target object. At this time, as shown in FIG. 12, the processor determines a candidate target object corresponding to the candidate box N as the target object, and causes the display to display the target object (represented as T in FIG. 12) in the region to be input, thereby achieving the input of the character.

In some embodiments, after S06, the method further includes step 15 (S15) to step 17 (S17).

In S15, the processor continues to obtain a plurality of consecutive frames of gesture images.

In S16, the processor determines whether a gesture in each of the plurality of consecutive frames of gesture images is the same as a preset deletion gesture.

Figure 13A:
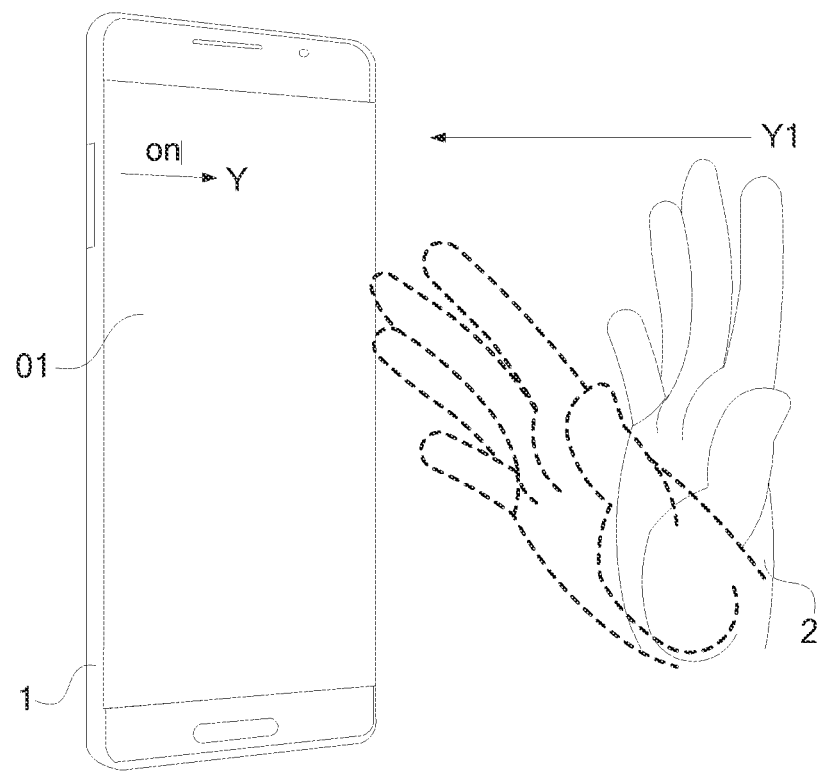
FIGS. 13A and 13B are schematic diagrams illustrating a process for deleting at least part of a target object by a processor, in accordance with some embodiments.
Figure 13B:
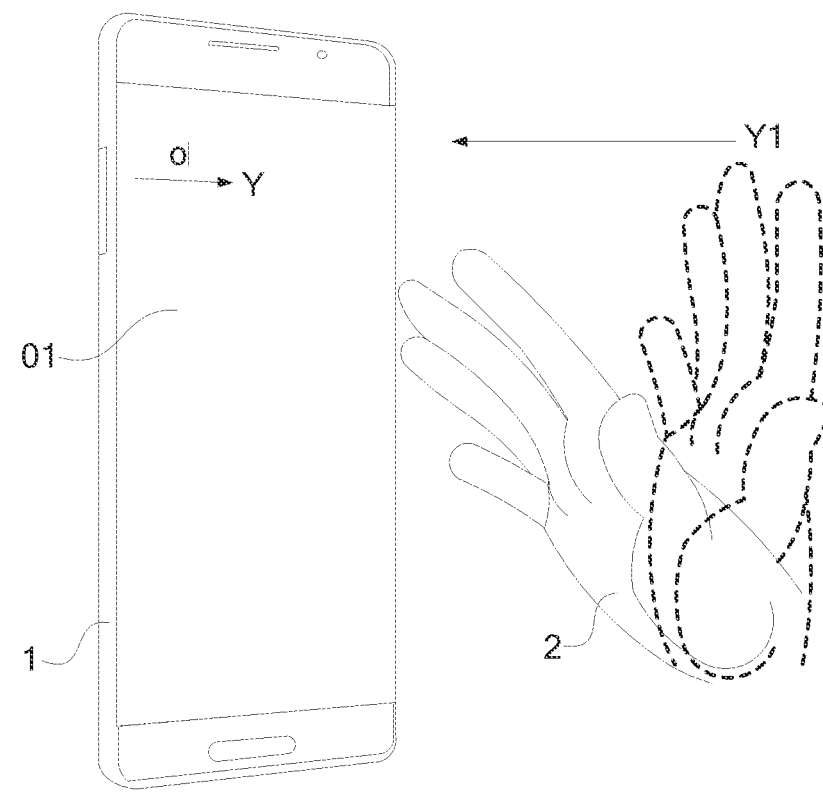

For example, as shown in FIGS. 13A and 13B, the preset deletion gesture is a gesture of waving in a third direction Y1. As shown in FIGS. 13A and 13B, the user makes the preset deletion gesture by making the palm of the hand 2 perpendicular to a plane where the display page 01 of the electronic device 1 is located and waving the hand in the third direction Y1. It will be noted that, the third direction Y1 is parallel to and opposite to a direction Y in which the characters in the region to be input on the display page 01 of the electronic device 1 are arranged.

In S17, in response to determining that the gesture in each of the plurality of consecutive frames of gesture images is the same as the preset deletion gesture, the processor deletes at least portion of the target object.

In the embodiments of the present disclosure, since a recognition result input due to misoperation of the user or the like is not a character required by the user, the user needs to delete at least portion of the character input. For example, as shown in FIGS. 13A and 13B, the user waves hand in the third direction Y1, and the processor obtains a plurality of consecutive frames of gesture images when the user waves hand, and deletes "n" in the target object "on" in response to determining that the gesture in the plurality of consecutive frames of gesture images is the same as the preset deletion gesture.

In some embodiments, as shown in FIG. 1, after S06, the method further includes step 18 (S18).

In S18, the processor clears the at least one stroke trace obtained in S05.

In the embodiments of the present disclosure, after finishing processing gesture images corresponding to one writing of the user, i.e., after finishing S06, the processor clears the at least one stroke trace obtained by processing the gesture images corresponding to the writing of the user, so as to prevent the at least one stroke trace from affecting gesture images corresponding to next writing of the user and processed by the processor.

Since in the input method provided by the embodiments of the present disclosure, the interruption of stroke trace may be achieved, the recognition result of the processor will not be affected even if the user inputs a plurality of characters at one time.

Based on this, in some embodiments, it is possible to achieve a switching between a single-character input mode and a multi-character input mode through a preset switching gesture, so that different requirements of the user may be met, thereby enhancing the practicability of handwriting input.

It will be noted that, in the embodiments of the present disclosure, the preset stroke gesture, the preset end stroke gesture, the preset selection gesture, the preset confirmation gesture, and the preset deletion gesture are not limited, which may be set according to the usage habit of the user.

It will be further noted that, in the embodiments of the present disclosure, the processor may eliminate frames of gesture images between different gesture switching processes, so that the accuracy of the method may be improved.

For convenience of understanding, in embodiments of the present disclosure, the method is described in detail through the flow diagrams shown in FIGS. 14A to 14F.

Figure 14A:
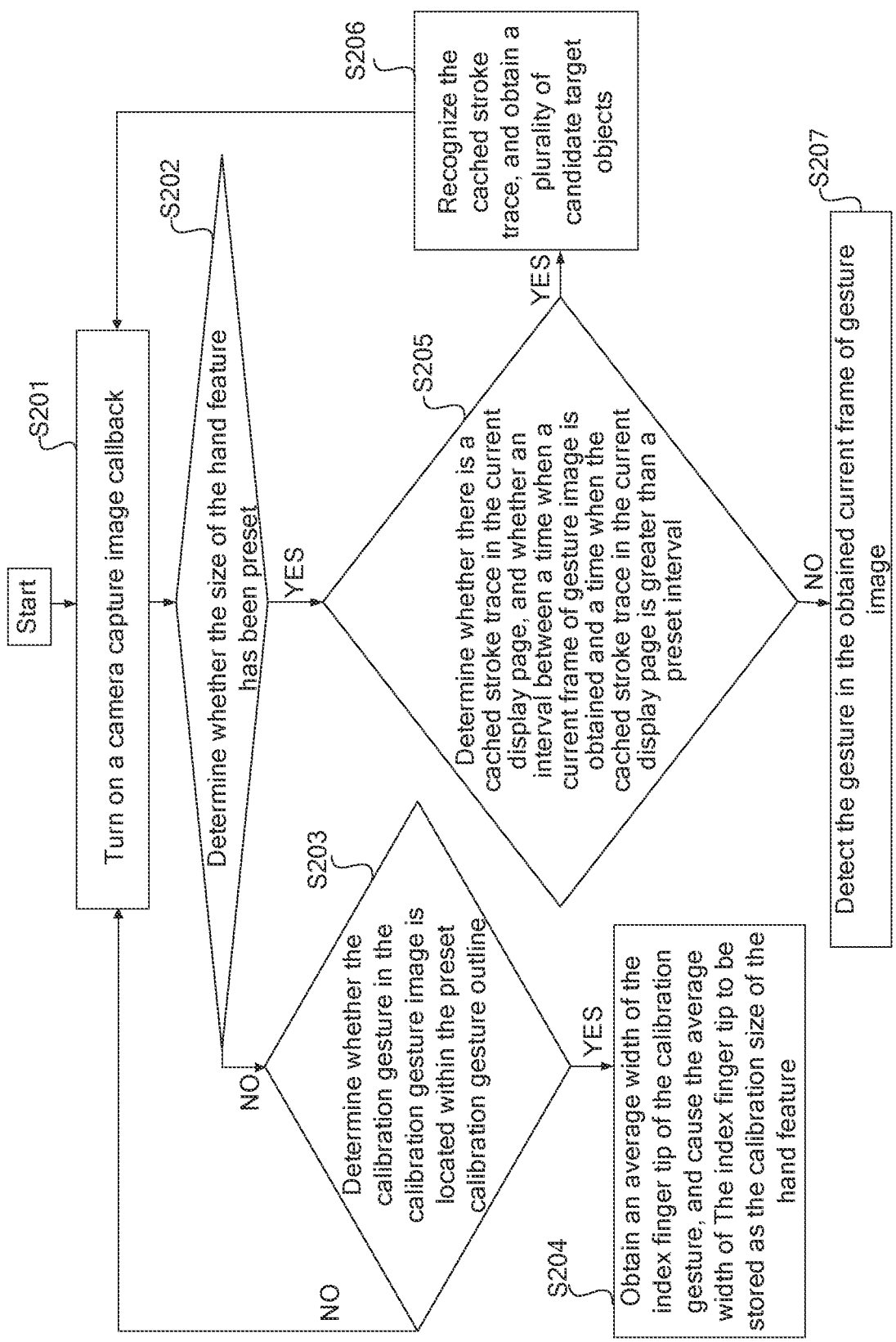
FIGS. 14A to 14F are schematic flow diagrams of yet another input method based on visual recognition, in accordance with some embodiments.

As shown in FIG. 14A, in step 201 (S201), a camera of an electronic device is turned on, and a camera capture image callback is turned on. That is, a callback function is called, so that the camera waits to capture the next frame of image.

Herein, after the camera is turned on, a camera preview interface may be displayed on a display page (i.e., an interactive page) of a display coupled to the camera, and after the camera capture image callback is turned on, the processor waits to capture image.

In the embodiments of the present disclosure, the entire preview interface is located within the display page, so that the user may check whether a stroke trace obtained by the processor is consistent with strokes written by the user through gestures in front of the display through the display page.

After S201, the process flows to step 202 (S202).

In S202, the processor determines whether a size of a hand feature has been preset. If the processor determines that the size of the hand feature has not been preset, the process flows to step 203 (S203).

In S203, a preset calibration gesture outline is displayed in the preview interface of the display of the electronic device, and the user is reminded to place the palm within the calibration gesture outline, and then, the camera starts to capture a calibration gesture image of the user. Afterwards, the processor determines whether a calibration gesture in the calibration gesture image is located within the preset calibration gesture outline.

If the processor determines that the calibration gesture in the calibration gesture image is located within the preset calibration gesture outline, the process flows to step 204 (S204).

In S204, the processor obtains an average width of the index finger tip of the calibration gesture in response to determining that the calibration gesture in the calibration gesture image is located within the preset calibration gesture outline, and causes the average width of the index finger tip to be stored as a calibration size of the hand feature. In this way, the presetting of the size of the hand features is finished.

If the processor determines that the calibration gesture in the calibration gesture image is not located within the preset calibration gesture outline, it indicates that the calibration is failed, and the user is reminded to place the palm within the calibration gesture outline again, and then the process returns to S201.

If the processor determines that the size of the hand feature has been preset, the process flows to step 205 (S205).

In S205, the processor determines whether there is a cached stroke trace in the current display page, and determines whether an interval between a time when a current frame of gesture image is obtained and a time when the cached stroke trace in the current display page is obtained is greater than a preset interval. If the processor determines that there is the cached stroke trace in the current display page, and determines that the interval between the time when the current frame of gesture image is obtained and the time when the cached stroke trace in the current display page is obtained is greater than the preset interval, the process flows to step 206 (S206).

It will be noted that, in the embodiments of the present disclosure, the processor may determine whether there is cached stroke trace(s) in the current display page, and determines whether the interval between the time when the current frame of gesture image is obtained and the time when the cached stroke trace in the current display page is obtained is greater than the preset interval in real time.

In S206, the processor recognizes the cached stroke trace in the current display page, obtains a plurality of candidate target objects, and causes the display to display the plurality of candidate target objects.

After S206, the process returns to S201.

If the processor determines that there is not the cached stroke trace in the current display page, or the processor determines that there is the cached stroke trace in the current display page, and determines that the interval between the time when the current frame of gesture image is obtained and the time when the cached stroke trace in the current display page is obtained is less than or equal to the preset interval, the process flows to step 207 (S207).

In S207, the processor detects a gesture in the current frame of gesture image obtained.

Figure 14B:
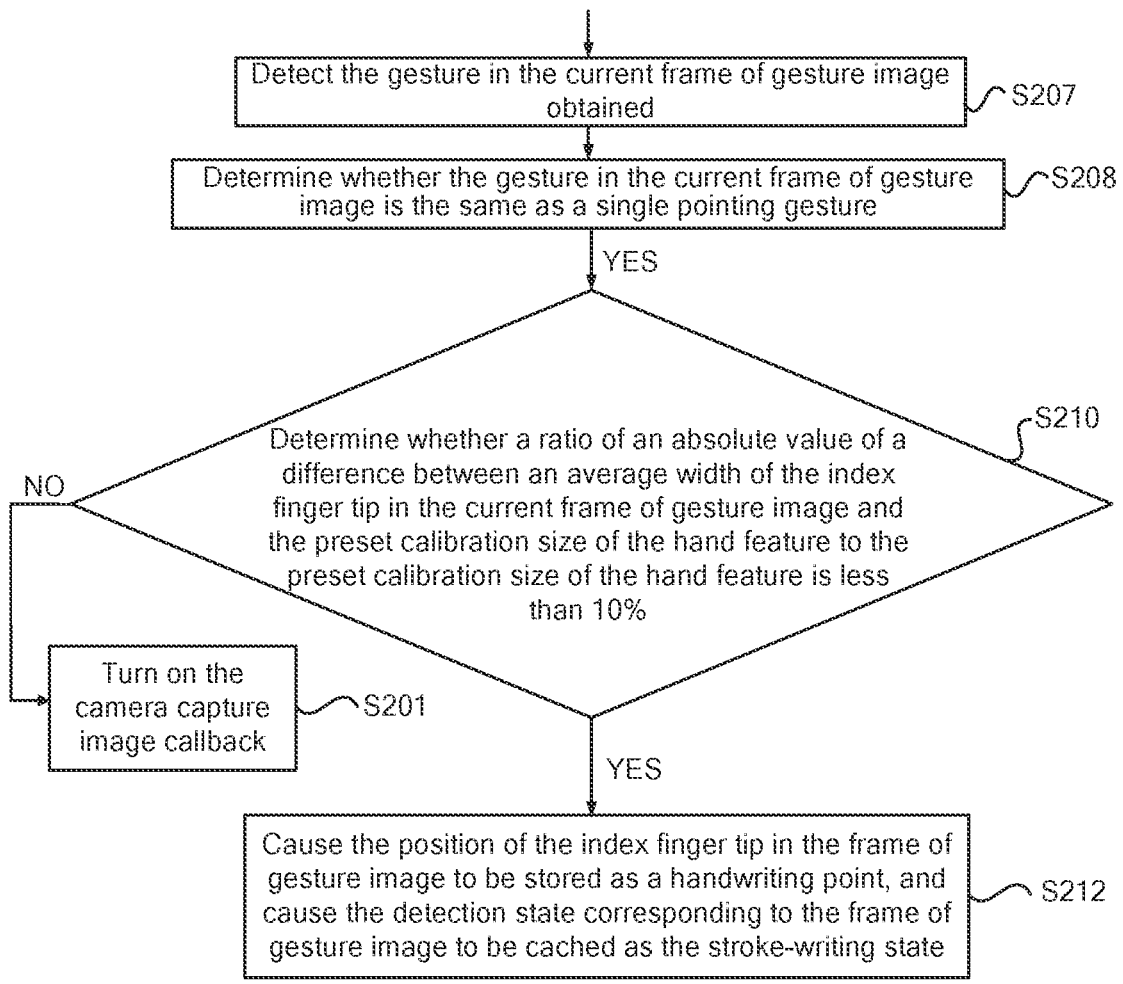
Figure 14C:
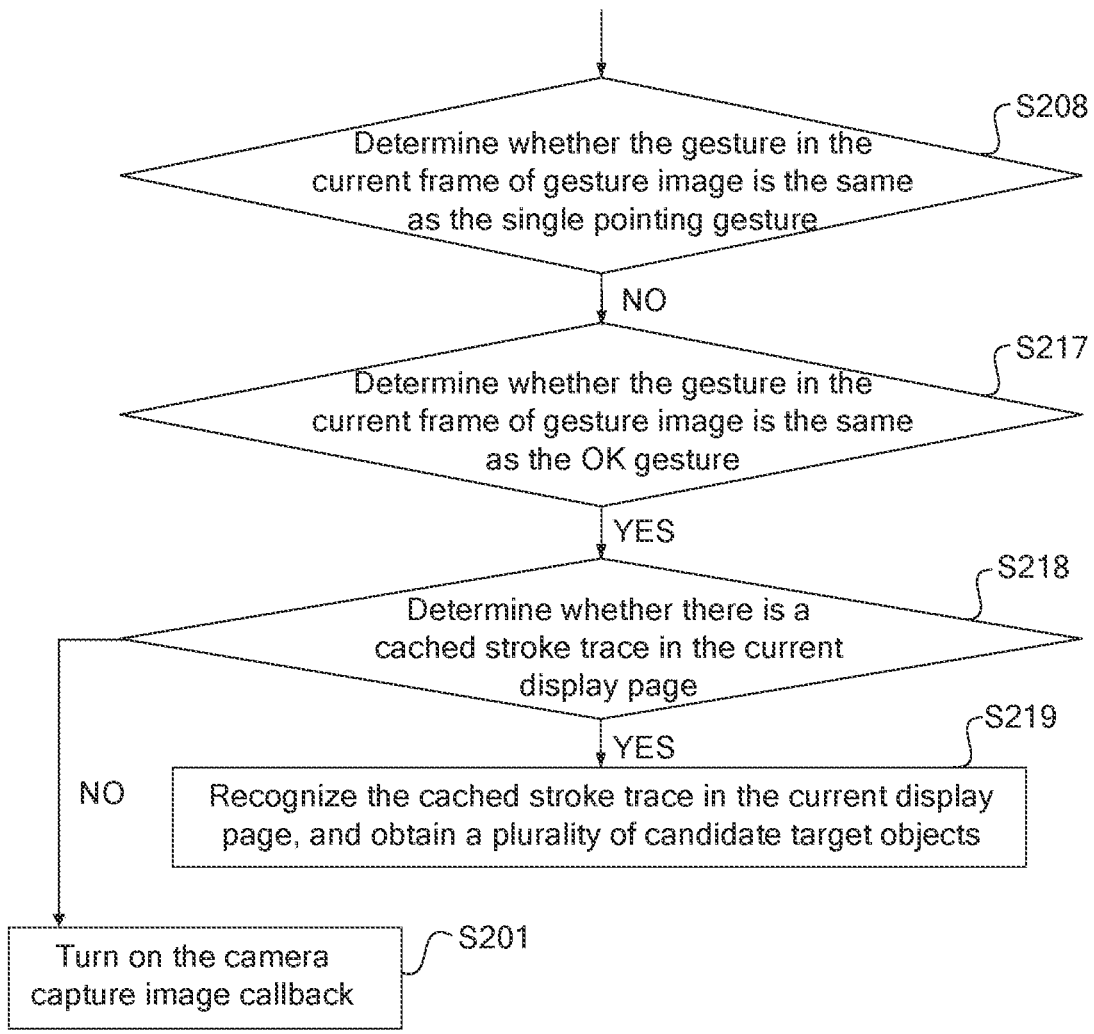

As shown in FIG. 14B, after S207, the process flows to step 208 (S208).

In S208, the processor determines whether the gesture in the current frame of gesture image is the same as a single pointing gesture. If the processor determines that the gesture in the current frame of the gesture image is the same as the single pointing gesture, the process flows to step 210 (S210).

In S210, the processor determines whether a ratio of an absolute value of a difference between an average width of the index finger tip in the current frame of gesture image and the preset calibration size of the hand feature to the preset calibration size of the hand feature is less than 10%.

If the processor determines that the ratio of the absolute value of the difference between the average width of the index finger tip in the current frame of gesture image and the preset calibration size of the hand feature to the preset calibration size of the hand feature is less than greater than or equal to 10%, it means that the index finger tip of the user is not in the effective writing space, and the stroke writing is not effective. In this case, the process returns to step 201, and then flows to S202.

If the processor determines that the ratio of the absolute value of the difference between the average width of the index finger tip in the current frame of gesture image and the preset calibration size of the hand feature to the preset calibration size of the hand feature is less than 10%, it means that there is a position of the hand feature corresponding to the handwriting point in the current frame of gesture image, and it may be determined that the user is continuing the stroke writing in a previous frame of gesture image in the current frame of gesture image. In this case, the process flows to step 212 (S212).

In S212, the processor causes a position of the index finger tip in the frame of gesture image to be stored as a handwriting point, and causes the detection state corresponding to the frame of gesture image to be cached as a stroke-writing state. That is, the processor causes a handwriting point corresponding to the position of the hand feature in the previous frame of gesture image and a handwriting point corresponding to the position of the hand feature in the current frame of gesture image to be connected to each other, to obtain at least portion of the stroke trace, and causes a detection state corresponding to the current frame of gesture image to be cached as the stroke-writing state at the same time.

Figure 14D:
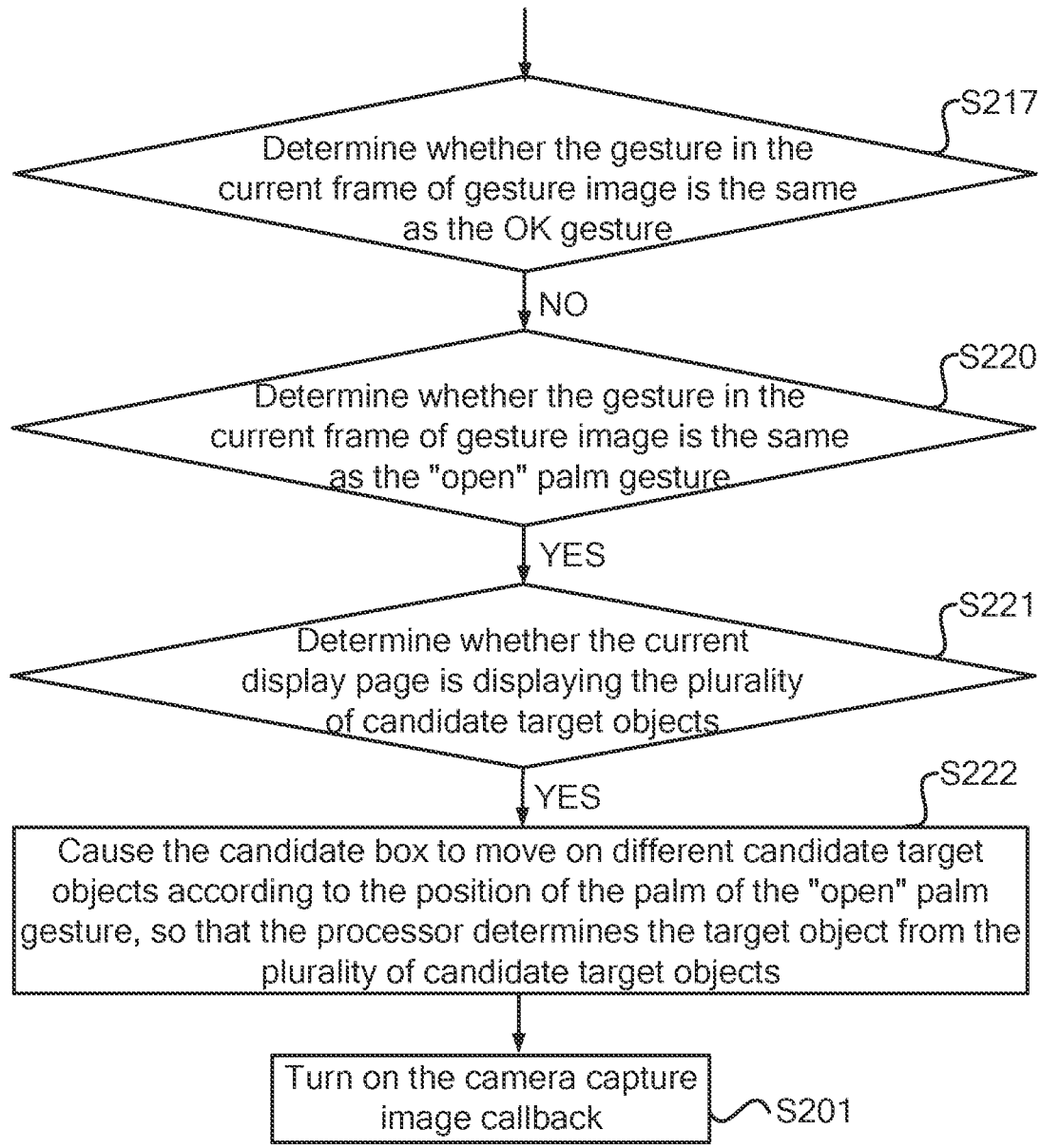
Figure 14E:
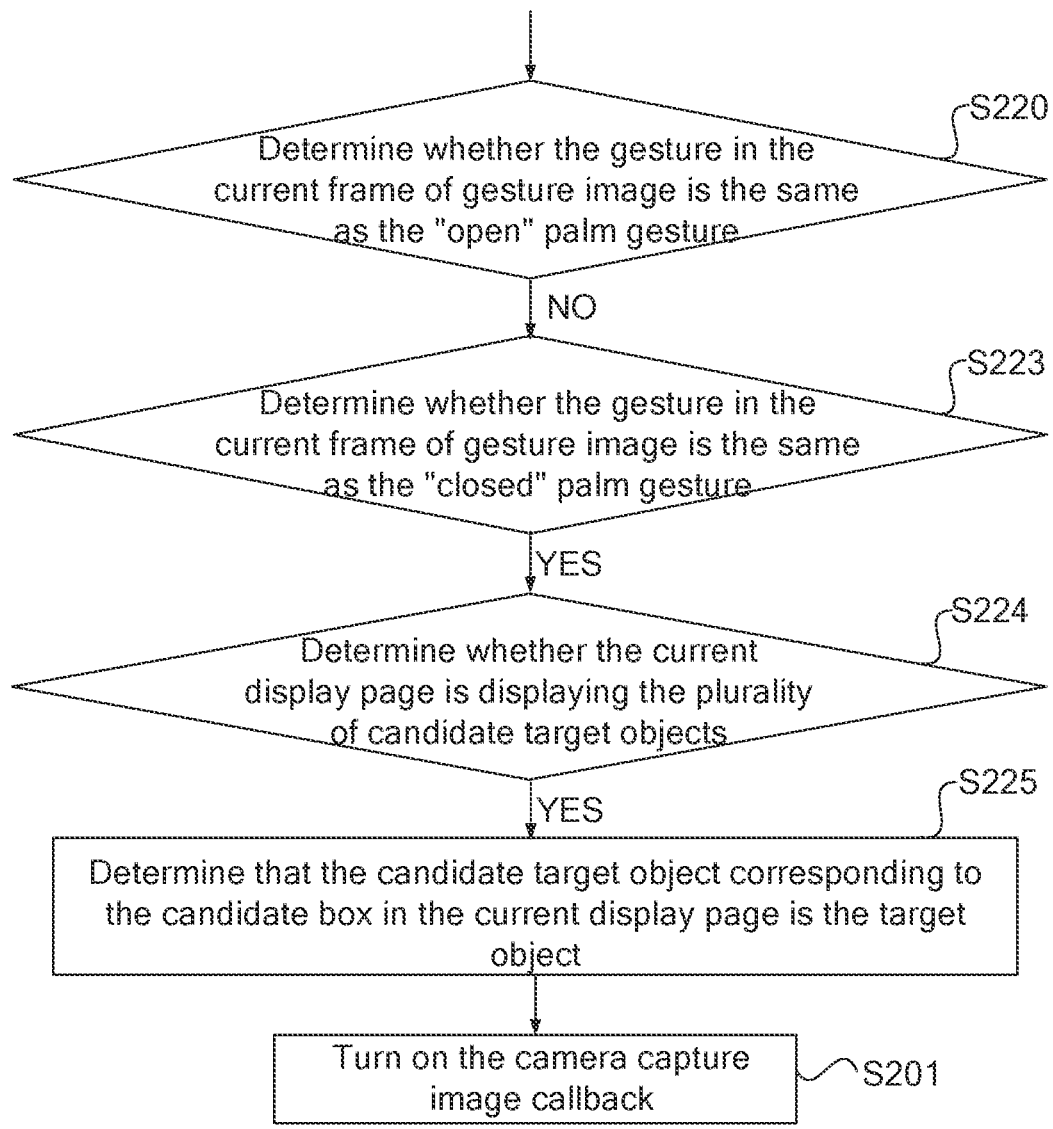
Figure 14F:
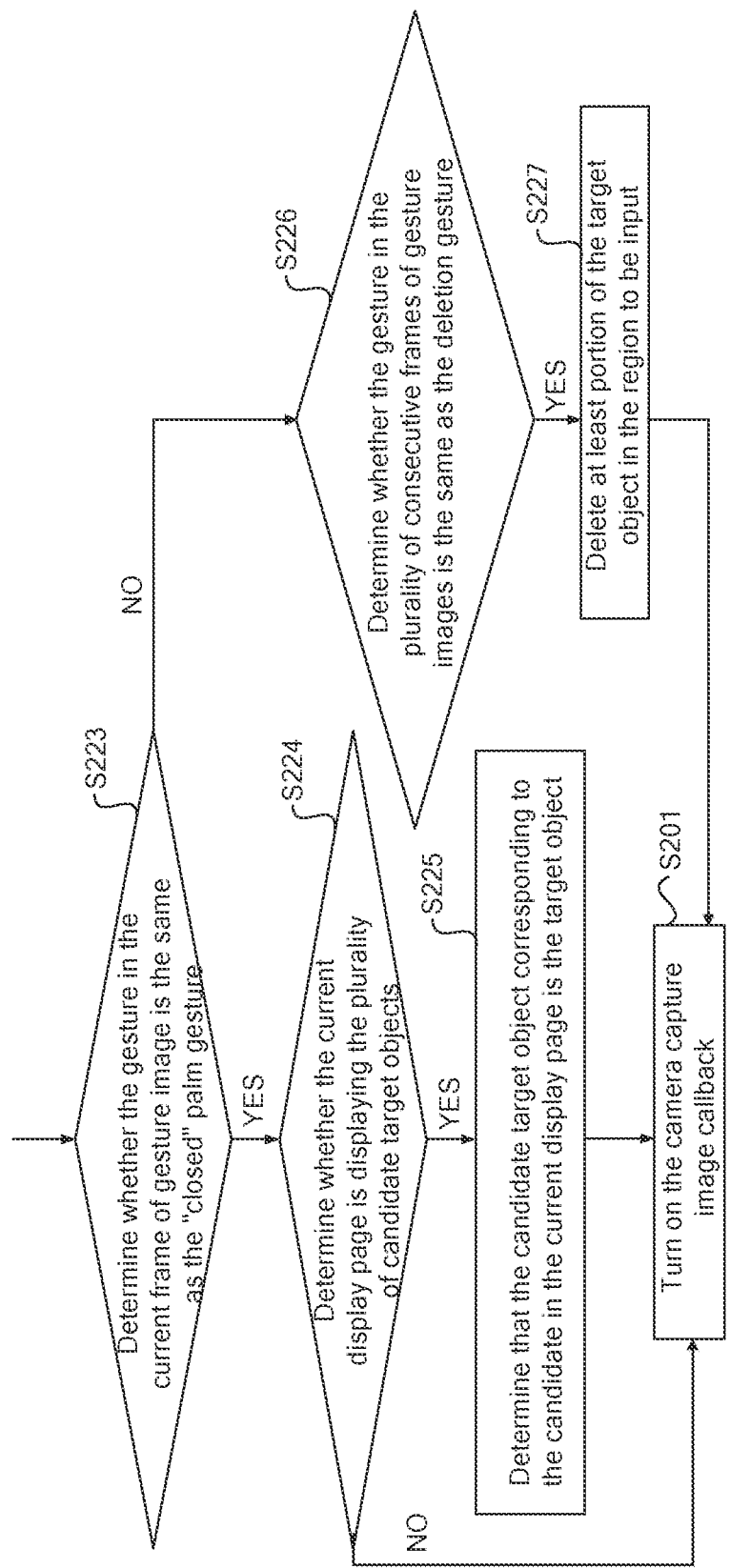

As shown in FIG. 14F, if the processor determines that the gesture in the current frame of the gesture image is different from the single pointing gesture, the process flows to step 217 (S217).

In S217, the processor determines whether the gesture in the current frame of gesture image is the same as the OK gesture. If the processor determines that the gesture in the current frame of gesture image is the same as the OK gesture, the process flows to step 218 (S218).

In S218, the processor determines whether there is a cached stroke trace in the current display page. If the processor determines that there is the cached stroke trace in the current display page, the process flows to step 219 (S219).

In S219, the processor recognizes the cached stroke trace in the current display page, obtains a plurality of candidate target objects, and causes the display to display the plurality of candidate target objects.

If the processor determines that there is not the cached stroke trace in the current display page, the process returns to S201, and the camera waits for capturing a next frame of image information.

As shown in FIG. 14D, if the processor determines that the gesture in the current frame of gesture image is different from the OK gesture when the processor performs S217, the process flows to step 220 (S220).

In S220, the processor determines whether the gesture in a current frame of gesture image is the same as the "open" palm gesture. If the processor determines that the gesture in the current frame of gesture image is the same as the "open" palm gesture, the process flows to step 221 (S221).

In S221, the processor determines whether the current display page is displaying a plurality of candidate target objects. If the processor determines that the current display page is displaying the plurality of candidate target objects, the process flows to step 222 (S222).

In S222, the processor causes a candidate box to move on different candidate target objects according to a position of the palm of the "open" palm gesture, so that the processor determines a target object from the plurality of candidate target objects.

If the processor determines that the current display page does not display the plurality of candidate target objects when performing S221, the process returns to S201, and the camera waits for capturing a next frame of image information.

As shown in FIG. 14E, if the processor determines that the gesture in the current frame of gesture image is different from the "open" palm gesture when performing S220, the process flows to step 223 (S223).

In S223, the processor determines whether the gesture in a current frame of gesture image is the same as the "closed" palm gesture. If the processor determines that the gesture in the current frame of gesture image is the same as the "closed" palm gesture, the process flows to step 224 (S224).

In S224, the processor determines whether the current display page is displaying a plurality of candidate target objects. If the processor determines that the current display page is displaying the plurality of candidate target objects, the process flows to step 225 (S225).

In S225, the processor determines that a candidate target object where the candidate box is located in the current display page is the target object, and causes the target object to be displayed in a region to be input in the current display page, thereby ending recognition of the writing of the user.

After S225, the process returns to S201.

If the processor determines that the current display page does not display the plurality of candidate target objects when performing S224, the process returns to S201.

As shown in FIG. 14F, if the processor determines that the gesture in a current frame of gesture image is different from the "closed" palm gesture, the process flows to step 226 (S226).

In S226, the processor determines whether a gesture in each of the plurality of consecutive frames of gesture images is the same as the deletion gesture, and the deletion gesture is a gesture of waving in a third direction Y1. If the processor determines that the gesture in each of the plurality of consecutive frames of gesture images is the same as the gesture of waving in the third direction Y1, the process flows to step 227 (S227).

In S227, the processor deletes at least portion of the target object in the region to be input.

If the processor determines that the gesture in each of the plurality of consecutive frames of gesture images is different from the gesture of waving in the third direction Y1 when performing S226, the process returns to step S201.

Figure 15:
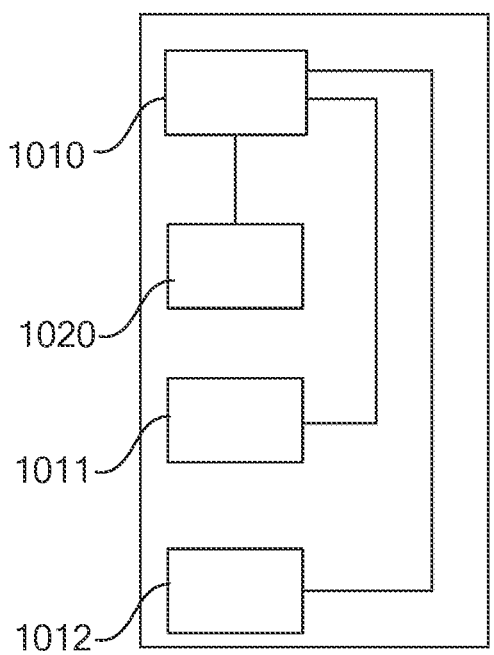
FIG. 15 is a structural schematic diagram of an input apparatus based on visual recognition, in accordance with some embodiments.

Some embodiments of the present disclosure provide an input apparatus 100 based on visual recognition. As shown in FIG. 15, the apparatus includes a processor 1010, a memory 1020, an image sensor 1011, and a display 1012 that are coupled to the processor 1010.

It will be noted that, in the embodiments of the present disclosure, the number of the memory 1020 and the image sensor 1011 is not limited.

The processor is configured to: obtain a plurality of frames of gesture images; recognizing a size and a position of a hand feature in each of the plurality of frames of gesture images; determine whether a variation amount in the size of the hand feature in each frame of gesture image as compared to a preset calibration size of the hand feature is less than a preset threshold value; in response to determining that a variation amount in a size of a hand feature, in each frame of gesture image in at least part of the plurality of frames of gesture images, as compared to the preset calibration size of the hand feature is less than the preset threshold value, send a position of the hand feature in the frame of gesture image to a memory as a handwriting point; obtain at least one stroke trace according to a plurality of handwriting points stored and send the at least one stroke trace to the memory and a display, each stroke trace including handwriting points stored in sequence according to positions of hand features in at least two consecutive frames of gesture images in the at least part of the plurality of frames of gesture images; recognize the at least one stroke trace, and obtain a target object corresponding to the at least one stroke trace; and send the target object to the display.

The memory is configured to store the preset calibration size of the hand feature, the threshold value, and the plurality of handwriting points.

The image sensor is configured to capture a plurality of frames of gesture images when the user writes, and send the plurality of captured frames of gesture images to the processor.

The display is configured to: display at least one stroke trace obtained by the processor, and display the target object determined by the processor.

In some examples, the processor is further configured to obtain the calibration size of the hand feature.

In some examples, the processor is further configured to determine a starting point and an ending point of a stroke trace of the at least one stroke trace.

In some examples, the processor is further configured to: determine whether an interval between a time when a current frame of gesture image is obtained and a time when the at least one stroke trace is obtained is greater than a preset interval, and recognize the at least one stroke trace in response to determining that the interval between the time when the current frame of gesture image is obtained and the time when the at least one stroke trace is obtained is greater than the preset interval. The time when the at least one stroke trace is obtained is a time when a frame of gesture image corresponding to a last handwriting point of the at least one stroke trace is obtained.

In some examples, the memory is further configured to store a database, so that the processor recognizes the at least one stroke trace according to the database, and obtains the target object corresponding to the at least one stroke trace. In some other examples, the database is provided outside the apparatus and communicational connected with the memory, and when the processor recognizes the at least one stroke trace, the processor may retrieve information in the database, so as to recognize the at least one stroke trace according to the information in the database.

Beneficial effects of the input apparatus are the same as beneficial effects of the method in embodiments described above, which will be not described herein again.

Some embodiments of the present disclosure provide an electronic device. The electronic device includes a memory and a processor. The memory has stored thereon a computer program executable on the processor, and the computer program, when executed by the processor, implements the method as described in any of the above embodiments may be implemented.

Figure 16:
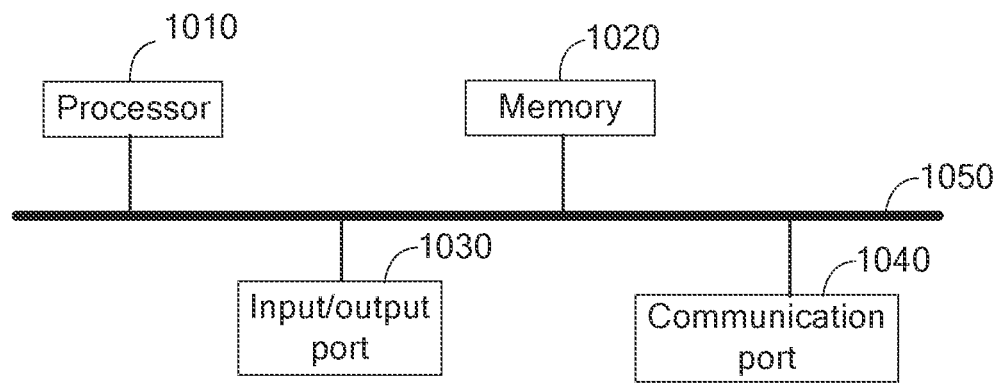
FIG. 16 is a structural schematic diagram of an electronic device, in accordance with some embodiments.

As shown in FIG. 16, the electronic device includes a processor 1010, a memory 1020, an input/output port 1030, a communication port 1040, and a bus 1050. The processor 1010, the memory 1020, the input/output port 1030, and the communication port 1040 are communicatively connected to one another inside the device through the bus 1050.

The processor 1010 may be implemented by using a general central processing unit (CPU), a microprocessor, an application specific integrated circuit (ASIC), or one or more integrated circuits for executing related programs, so as to implement the technical solutions provided by the embodiments of the present disclosure.

The memory 1020 may be implemented in a form of a read only memory (ROM), a random access memory (RAM), a static storage device, or a dynamic storage device. The memory 1020 may store an operating system and other application programs. When the technical solutions provided by the embodiments of the present disclosure are implemented in software and/or firmware, related program codes may be stored in the memory 1020, and are called and executed by the processor 1010.

The input/output port 1030 is used to connect an input/output device to achieve the input and output of information. The input/output device may be configured as a component in the device (not shown in the FIG. 16), or may be externally connected to the device to provide corresponding functions. The input device may include at least one of keyboards, mice, touch screens, microphones, various sensors, etc., and the output device may include at least one of displays, speakers, vibrators, indicators, etc.

The communication port 1040 is used to connect a communication device (not shown in the FIG. 16) to implement communication interaction between the electronic device and other devices. The communication device may implement communication in a wired manner (e.g., USB, network cable), or in a wireless manner (e.g., mobile network, WIFI, Bluetooth).

The bus 1050 includes a path for transmitting information among various components of the electronic device (e.g., the processor 1010, the memory 1020, the input/output port 1030 and the communication port 1040).

It will be noted that, although the above electronic device only shows the processor 1010, the memory 1020, the input/output port 1030, the communication port 1040, and the bus 1050, in a specific implementation process, the electronic device may further include other components necessary for normal operation. In addition, those skilled in the art can understand that the above electronic device may only include components necessary to implement the technical solutions of the embodiments of the present disclosure, and does not necessarily include all the components shown in the FIG. 16.

Some embodiments of the present disclosure provide a computer-readable storage medium (e.g. a non-transitory computer-readable storage medium). The computer readable storage medium has stored therein one or more computer program instructions that, when executed by a processor, cause the processor to perform steps of the method as described in any one of the above embodiments.

For example, the computer-readable storage medium may include, but is not limited to a magnetic storage device (e.g., a hard disk, a floppy disk or a magnetic tape), an optical disk (e.g., a compact disk (CD), a digital versatile disk (DVD), a smart card or a flash memory device (e.g., an erasable programmable read-only memory (EPROM), a card, a stick or a key driver). Various computer-readable storage media described in the present disclosure may represent one or more devices and/or other machine-readable storage media for storing information. The term "machine-readable storage media" may include, but are not limited to, wireless channels and other various media capable of storing, containing and/or carrying instructions and/or data.

Beneficial effects of the electronic device and the non-transitory computer-readable storage medium are the same as beneficial effects of the method in some embodiments described above, which will be not described herein again.

The foregoing descriptions are merely specific implementation manners of the present disclosure, but the protection scope of the present disclosure is not limited thereto. Any person skilled in the art could conceive of changes or replacements within the technical scope of the present disclosure, which shall be included in the protection scope of the present disclosure. Therefore, the protection scope of the present disclosure shall be subject to the protection scope of the claims.

What is claimed is:

1. An input method based on visual recognition, performed at a processor, the method comprising:
   obtaining a plurality of frames of gesture images;
   recognizing a size and a position of a hand feature in each frame of gesture image of the plurality of frames of gesture images;
   determining whether a variation amount in the size of the hand feature in the frame of gesture image as compared to a preset calibration size of the hand feature is less than a preset threshold value;
   in response to determining that a variation amount in a size of a hand feature, in each frame of gesture image in at least part of the plurality of frames of gesture images, as compared to the preset demarcated size of the hand feature is less than the preset threshold value, causing a position of the hand feature in the frame of gesture image to be stored as a handwriting point;
   obtaining at least one stroke trace according to a plurality of handwriting points stored, each stroke trace including handwriting points stored in sequence according to positions of hand features in at least two consecutive frames of gesture images in the at least part of the plurality of frames of gesture images; and
   recognizing the at least one stroke trace and obtaining a target object corresponding to the at least one stroke trace.

2. The method according to claim 1, wherein before determining whether the variation amount in the size of the hand feature in the frame of gesture image as compared to the preset calibration size of the hand feature is less than the preset threshold value, the method further comprises:
   obtaining the calibration size of the hand feature.

3. The method according to claim 2, wherein obtaining the calibration size of the hand feature includes:
   obtaining a calibration gesture image;
   determining whether a calibration gesture in the calibration gesture image is located within a preset calibration gesture outline; and
   in response to determining that the calibration gesture in the calibration gesture image is located within the preset calibration gesture outline, obtaining a size of a hand feature of the calibration gesture and causing the size to be stored as the calibration size of the hand feature.

4. The method according to claim 1, wherein obtaining a stroke trace of the at least one stroke trace includes:
   determining a starting point of the stroke trace; and
   determining an ending point of the stroke trace.

5. The method according to claim 4, wherein determining the starting point of the stroke trace includes:
   determining whether there is a position of a hand feature corresponding to a handwriting point in a previous frame of gesture image adjacent to any frame of frames of gesture images corresponding to the plurality of handwriting points; and
   in response to determining that there is not the position of the hand feature corresponding to the handwriting point in the previous frame of gesture image, determining that a handwriting point corresponding to a position of a hand feature in the frame of gesture image is the starting point of the stroke trace.

6. The method according to claim 4, wherein determining the ending point of the stroke trace includes:
   determining whether there is a position of a hand feature corresponding to a handwriting point in a next frame of gesture image adjacent to any frame of frames of gesture images corresponding to the plurality of handwriting points; and
   in response to determining that there is not the position of the hand feature corresponding to the handwriting point in the next frame of gesture image, determining that a handwriting point corresponding to a position of a hand feature in the frame of gesture image is the ending point of the stroke trace.

7. The method according to claim 1, wherein after obtaining the at least one stroke trace and before recognizing the at least one stroke trace, the input method further comprises:
   determining whether an interval between a time when a current frame of gesture image is obtained and a time when the at least one stroke trace is obtained is greater than a preset interval, the time when the at least one stroke trace is obtained being a time when a frame of gesture image corresponding to a last handwriting point of the at least one stroke trace is obtained; and
   in response to determining that the interval between the time when the current frame of gesture image is obtained and the time when the at least one stroke trace is obtained is greater than the preset interval, recognizing the at least one stroke trace.

8. The method according to claim 7, wherein in response to determining that the interval between the time when the current frame of gesture image is obtained and the time when the at least one stroke trace is obtained is less than or equal to the preset interval, the method further comprises:
   obtaining the current frame of gesture image;
   determining whether a gesture in the current frame of gesture image is same as a preset stroke gesture;
   in response to determining that the gesture in the current frame of gesture image is same as the preset stroke gesture, determining whether a variation amount in a size of a hand feature in the current frame of gesture image as compared to the preset calibration size of the hand feature is less than the preset threshold value; and
   in response to determining that the variation amount in the size of the hand feature in the current frame of gesture image as compared to the preset calibration size of the hand feature is less than the preset threshold value, causing a position of the hand feature in the current frame of gesture image to be stored as a handwriting point.

9. The method according to claim 1, wherein after obtaining the at least one stroke trace and before recognizing the at least one stroke trace, the method further comprises:
   obtaining a current frame of gesture image;
   determining whether a gesture in the current frame of gesture image is same as a preset end stroke gesture; and
   in response to determining that the gesture in the current frame of gesture image is same as the preset end stroke gesture, recognizing the at least one stroke trace.

10. The method according to claim 1, wherein recognizing the at least one stroke trace and obtaining the target object corresponding to the at least one stroke trace includes:
    recognizing the at least one stroke trace, and obtaining a plurality of candidate target objects corresponding to the at least one stroke trace; and
    determining the target object from the plurality of candidate target objects.

11. The method according to claim 10, wherein determining the target object from the plurality of candidate target objects includes:
    continuing to obtain a plurality of consecutive frames of gesture images;
    determining whether a gesture in each of the plurality of consecutive frames of gesture images is same as a preset selection gesture; and
    in response to determining that the gesture in each of the plurality of consecutive frames of gesture images is same as the preset selection gesture, determining the target object from the plurality of candidate target objects according to a hand position in a last frame of the plurality of consecutive frames of gesture images.

12. The method according to claim 11, wherein determining the target object from the plurality of candidate target objects according to the hand position in the last frame of the plurality of consecutive frames of gesture images includes:
    continuing to obtain at least one frame of gesture image after the last frame of the plurality of consecutive frames of gesture images;
    determining whether a gesture in the at least one frame of gesture image after the last frame of the plurality of consecutive frames of gesture images is same as a preset confirmation gesture; and
    in response to determining that the gesture in the at least one frame of gesture image after the last frame of the plurality of consecutive frames of gesture images is same as the preset confirmation gesture, determining a candidate target object corresponding to the hand position in the last frame of the plurality of consecutive frames of gesture images as the target object.

13. The method according to claim 1, wherein after recognizing the at least one stroke trace and obtaining the target object corresponding to the at least one stroke trace, the method further comprises:
    continuing to obtain a plurality of consecutive frames of gesture images;
    determining whether a gesture in each of the plurality of consecutive frames of gesture images is same as a preset deletion gesture; and
    in response to determining that the gesture in each of the plurality of consecutive frames of gesture images is same as the preset deletion gesture, deleting at least portion of the target object.

14. The method according to claim 1, wherein after recognizing the at least one stroke trace and obtaining the target object corresponding to the at least one stroke trace, the method further comprises:
    clearing the at least one stroke trace.

15. An input apparatus based on visual recognition, the apparatus comprising:
    a processor, configured to:

obtain a plurality of frames of gesture images;

recognizing a size and a position of a hand feature in each frame of gesture image of the plurality of frames of gesture images;

determine whether a variation amount in the size of the hand feature in the frame of gesture image as compared to a preset calibration size of the hand feature is less than a preset threshold value;

in response to determining that a variation amount in a size of a hand feature, in each frame of gesture image in at least part of the plurality of frames of gesture images, as compared to the preset calibration size of the hand feature is less than the preset threshold value, send a position of the hand feature in the frame of gesture image to a memory as a handwriting point;

obtain at least one stroke trace according to a plurality of handwriting points stored and send the at least one stroke trace to the memory and a display; wherein each stroke trace includes handwriting points stored in sequence according to positions of hand features in at least two consecutive frames of gesture images in the at least part of the plurality of frames of gesture images;

recognize the at least one stroke trace and obtain a target object corresponding to the at least one stroke trace; and send the target object to the display;

the memory coupled to the processor, the memory configured to:

store the preset calibration size of the hand feature, the preset threshold value, and the plurality of handwriting points;

an image sensor coupled to the processor, the image sensor configured to:

capture a plurality of frames of gesture images and send the plurality of captured frames of gesture images to the processor; and the display coupled to the processor, the display configured to:

display the at least one stroke trace and the target object.

16. The apparatus according to claim 15, wherein the processor is further configured to obtain the calibration size of the hand feature.

17. The apparatus according to claim 15, wherein the processor is further configured to determine a starting point and an ending point of a stroke trace of the at least one stroke trace.

18. The apparatus according to claim 15, wherein the processor is further configured to:

determine whether an interval between a time when a current frame of gesture image is obtained and a time when the at least one stroke trace is obtained is greater than a preset interval, the time when the at least one stroke trace is obtained being a time when a frame of gesture image corresponding to a last handwriting point of the at least one stroke trace is obtained; and in response to determining that the interval between the time when the current frame of gesture image is obtained and the time when the at least one stroke trace is obtained is greater than the preset interval, recognize the at least one stroke trace.

19. An electronic device, comprising a memory and a processor, wherein the memory has stored thereon a computer program executable on the processor, and the computer program, when executed by the processor, implements the method according to claim 1.

20. A non-transitory computer-readable storage medium for storing one or more computer program instructions that, when executed by a processor, cause the processor to perform steps of the method according to claim 1.

* * * * *